United States Patent
Newnham

(10) Patent No.: US 10,360,574 B2
(45) Date of Patent: Jul. 23, 2019

(54) SYSTEMS AND METHODS FOR RESPONSE RATE DETERMINATION AND OFFER SELECTION

(71) Applicant: NICE LTD., Ra'anana (IL)

(72) Inventor: Leonard Michael Newnham, Buckingham (GB)

(73) Assignee: NICE LTD., Ra'anana (IL)

( * ) Notice: Subject to any disclaimer, the term of this patent is extended or adjusted under 35 U.S.C. 154(b) by 667 days.

(21) Appl. No.: 14/583,709

(22) Filed: Dec. 28, 2014

(65) Prior Publication Data
US 2016/0189176 A1    Jun. 30, 2016

(51) Int. Cl.
*G06Q 30/00* (2012.01)
*G06Q 30/02* (2012.01)

(52) U.S. Cl.
CPC ......... *G06Q 30/0202* (2013.01); *G06Q 30/00* (2013.01)

(58) Field of Classification Search
CPC .......... G06Q 30/0255; G06Q 30/0235; G06Q 10/105; G06Q 10/103; G06Q 10/067; G06Q 30/02; G06Q 10/06315; G06Q 40/00; G06Q 30/00; G06Q 30/06; H04Q 7/20
See application file for complete search history.

(56) References Cited

U.S. PATENT DOCUMENTS

| | | | | |
|---|---|---|---|---|
| 6,317,752 B1 * | 11/2001 | Lee | ................... | G06F 17/30595 707/748 |
| 8,712,943 B1 * | 4/2014 | Kim | ...................... | G06Q 50/01 706/45 |
| 8,767,947 B1 * | 7/2014 | Ristock | .............. | G06Q 10/0631 379/266.08 |
| 2003/0130983 A1 * | 7/2003 | Rebane | .................. | G06Q 30/02 |

(Continued)

OTHER PUBLICATIONS

Abdelzaher, et al. Web content adaptation to improve server overload behavior; Elsevier Science B.V; pp. 485-499 (Year: 1999).*

(Continued)

*Primary Examiner* — Mehmet Yesildag
*Assistant Examiner* — Uche Byrd
(74) *Attorney, Agent, or Firm* — Pearl Cohen Zedek Latzer Baratz LLP

(57) ABSTRACT

Methods and systems for calculating a current response rate to an offer are disclosed. Examples of offers include but are not limited to design options for a web page and scripts used by operators in a call center. An offer may be served multiple times to one or more users and the current response rate may be determined for a point in time. The method may comprise obtaining estimates of response rate in successive iterations of response rate estimation. Each estimate may be determined over a period of time ending at the point in time, and each estimate may be determined over a larger period of time than the previous estimate. A range of uncertainty may be defined by upper and lower bounds for the estimates of (Continued)

response rate, with at least the first estimate being within the range of uncertainty. Each estimate may be compared to one or both of the upper and lower bounds and the result of the comparison may be used in the selection of one of the estimates as the calculated current response rate.

15 Claims, 12 Drawing Sheets

(56) References Cited

U.S. PATENT DOCUMENTS

| | | | |
|---|---|---|---|
| 2003/0135442 A1* | 7/2003 | Kumar | G06Q 40/04 705/37 |
| 2007/0016666 A1* | 1/2007 | Duffield | H04L 12/14 709/223 |
| 2013/0046618 A1* | 2/2013 | Ferber | G06Q 30/02 705/14.45 |

OTHER PUBLICATIONS

Scott. "Multi-armed bandit experiments" url: https://support.google.com/analytics/answer/2844870?hl=en&ref_topic=2844866 retrieved on Apr. 7, 2015.

* cited by examiner

FIG. 9

SYSTEMS AND METHODS FOR RESPONSE RATE DETERMINATION AND OFFER SELECTION

FIELD OF THE INVENTION

The present invention is in the field of A/B testing used for example to determine the best performing of a number of offers. Examples of offers include but are not limited to design options for a web page and scripts used by operators in a call center.

BACKGROUND OF THE INVENTION

The following are definitions of terms used in this description and in the field to which the invention relates:

The term "offer" is used herein to denote one of a number of alternatives that may be presented to a potential respondent. Other commonly used terms for "offer" include "option" and "action".

"Respondent", or potential respondent usually refers to a person who is expected to respond to an offer.

"Responses" can be in various forms and at various levels. Thus examples of responses include "clicks" on a link on a web page, purchase of a product or other acquisition e.g. within a predetermined time period, and a yes (or no) answer to a question posed or sentence read by a call center operator. These are not limiting examples and others will be apparent to those skilled in the art. Sometimes the term "response" is used to denote a positive response, for example in situations where a negative response to an offer is possible.

"Traffic" is used to refer to calls to a call center, visits to a website and other events that lead to the presentation of an offer to a potential respondent.

An offer is said to be "served" to a potential respondent. The serving of an offer may take the form of presentation of a web page, in which case it is commonly referred to as an "impression". Other examples of serving of an offer include but are not limited to reading a piece of text (script) to a caller, playing a piece of music such as an advertising jingle and mailing a flyer or advertising material e.g. in paper form.

"Serve fraction" refers to the ratio of the number of serves of a particular offer to the total number of serves of offers in a set of possible alternative offers, e.g. for the same traffic. The serve fraction may be determined over a time period or total number of offers.

"Response rate" is usually measured as ratio of responses to serves of a particular offer, but can also be measured in terms of number of responses in a unit time period, for example if the rate of serve is relatively stable. Number of serves and time period can be considered to be equivalent. Response rate can also be determined as a ratio of positive responses to serves, where negative responses are possible, or a ratio of positive responses to a total of non-responses plus negative responses.

"Standard error" StdErr is a well-known statistical parameter and may be used for example as a measure of confidence in a calculation such as a calculation of response rate. Where several calculations are performed a standard deviation may be determined, with the standard error being related to the standard deviation StdDev by the equation:

StdErr=Stdev/sqrt($n$), where n represents the number of calculations used to determine the standard deviation. Thus the standard error decreases as sample size increases.

The serving of an inferior offer, e.g. one believed to have a lower response rate than another, which may be done for example to check that it is still indeed inferior, is referred to as "exploration", whereas other serves are referred to as "exploitation".

"Conversion" is one of several kinds of response that may be measured and is generally used to refer to the serving of an offer resulting in a sale of a product.

A "user" as referred to herein may be the owner of a website, operator of a call system or operator of any other system in which it is desirable to optimize an offer.

"UCB" is an acronym for upper confidence bound.

Processes in which two or more offers are tested to determine which performs best include so-called "A/B testing". A/B testing can be used anywhere to establish the best performing of two or more offers. Examples of offers for which A/B testing can be used include:
    design options for a webpage,
    different calls to action presented on a webpage
    scripts used in a call centre
    pieces of music, e.g. used in audio advertisements
    flyers and advertising material in paper form
    other situations where one of several alternatives may be presented to a potential respondent in any way including but not limited to visually and audibly.

A/B Testing software solutions have been available for a number of years. A simple example is shown schematically in FIG. 1 for two offers only denoted as Version A and Version B. A standard A/B testing procedure may operate as follows:
    Run experiment, splitting the traffic equally between offers A and B—as a result 50% of potential respondents are presented with version A and the other 50% are presented with version B
    Continue for a sufficient time to ensure results, e.g. conversions of presentations or serves of offers into sale of a product, are going to be statistically significant
    Validate results, e.g. analysis by human
    Present the "winner", e.g. the version with the highest conversion rate, to all future potential respondents.

It will be appreciated that the example of FIG. 1 can be scaled up for a larger number of versions than two. This is still referred to in the art as "A/B testing".

Using this simple approach, customers may receive many more serves of an inferior offer than is necessary to test its performance, e.g. response rate, conversion rate or revenue generated. This may detract from the respondent experience and may cost the operating company money, for example in terms of lost sales. Therefore in some circumstances it may be desirable to reduce the number of serves, e.g. presentations, of an inferior offer, e.g. one with a lower conversion or other response rate, as compared to the simple test illustrated in FIG. 1. For some applications of A/B testing, a goal may be to present an offer no more than the minimum number of times needed to establish that it is indeed inferior.

"Multi-armed Bandit" testing provides an efficient method of reducing the number of serves of an inferior offer. The multi-armed bandit problem is well known in probability theory and is named after the problem faced by a gambler deciding which of a row of slot machines (such as one-armed bandits) to play and how many times to play each one. The problem can be mathematically modeled and the model may be used in a variety of applications other than gambling, for example the serving of offers as discussed above. Thus the term "multi-armed bandit" is commonly used and is used herein to refer to a mathematical model of the multi-armed bandit problem.

FIG. 2, FIG. 3 and FIG. 4 illustrate a process using a multi-armed bandit for A/B testing. As shown in FIG. 2, a testing system may start by splitting traffic randomly, usually equally between the two or more offers. As the bandit receives feedback about the performance of each offer, it will start to favor one more than the others. Thus, FIG. 3 shows version A receiving less traffic than version B because it has a lower conversion rate. The bandit may use many different algorithms to do this, but each will be trying to reduce the number of times it chooses an inferior alternative, over the long run. As the bandit receives more feedback it will start to converge, choosing one alternative almost exclusively, as shown in FIG. 4.

One known multi-armed bandit algorithm is termed UCB and relies on the use of a UCB to determine which of a number of alternatives to serve. Using such algorithms enables the finding of the best offer to be fast and automatic.

The process shown in FIGS. 2-4 does not take account of the possibility that the performance of one offer versus another may change over time. This is addressed to some extent by the continued use of exploratory serves after the identification of the best performer. However there is room for improvement in the use of exploratory serves whilst minimizing serves of offers that do not achieve the best response rate.

SUMMARY OF EMBODIMENTS OF THE INVENTION

Embodiments of the invention provide methods and systems for calculating or determining a current response rate to an offer, e.g. a response rate at a particular point in time. A response rate may be determined over a period of time or number of serves of the offer. According to embodiments of the invention, successive iterations of response rate estimation are performed, each over a larger period of time than the previous iteration. Each period of time may end at the particular point in time for which the response rate is being estimated. In this way each successive estimate may include more historical data. A range of uncertainty may be determined defined by upper and lower bounds for the estimates. The first estimate and possibly subsequent estimates may be within the range of uncertainty. Each estimate may be compared to one or both of the upper and lower bounds. The results of the comparison may then be used to select one of the estimates as the current response rate.

The calculation of current response rate according to embodiments of the invention may be used in the selection of one offer or another to be served to a potential respondent. In the following, "selection" and "decision" are used interchangeably since a selection of an offer is the result of a decision as to which offer should be served.

Embodiments of the invention also provide methods and systems for selecting an offer to be served amongst a set of offers. For at least one of the offers, for example an offer that does not have the highest response rate, a corresponding serve proportion may be determined. A random selection process may then be used to select an offer to be served using the serve proportion as a weighting factor for the corresponding offer.

BRIEF DESCRIPTION OF THE DRAWINGS

The subject matter regarded as the invention is particularly pointed out and distinctly claimed in the concluding portion of the specification. Embodiments of the invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

FIG. 9 shows a screen shot such as might be shown to a user during A/B testing configuration according to embodiments of the invention;

DETAILED DESCRIPTION OF EMBODIMENTS OF THE INVENTION

Figure 1:
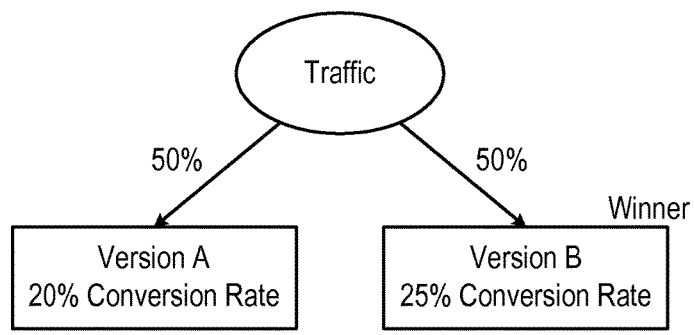
FIG. 1 is a schematic diagram of a standard A/B testing procedure according to embodiments of the invention showing that version B has improved conversion rate after a fixed testing phase.
Figure 2:
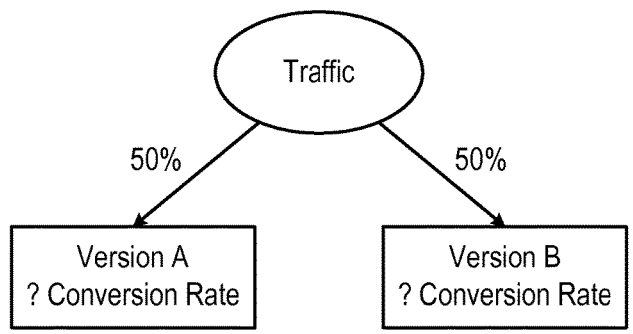
FIG. 2 is a schematic diagram of a multi-armed bandit A/B testing procedure according to embodiments of the invention showing that at the start of the procedure exploration is split randomly between the offers.
Figure 3:
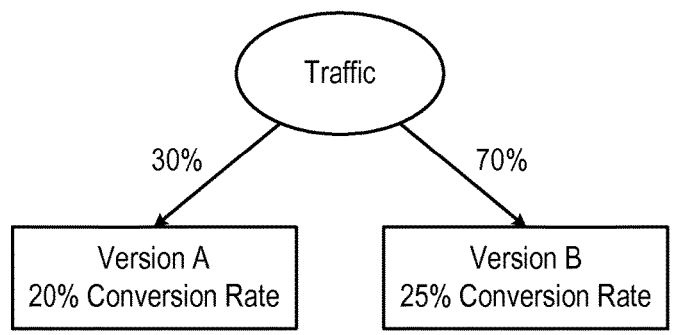
FIG. 3 is a schematic diagram of a multi-armed bandit A/B testing procedure according to embodiments of the invention showing a later stage than FIG. 2 at which one offer is preferred over another.
Figure 4:
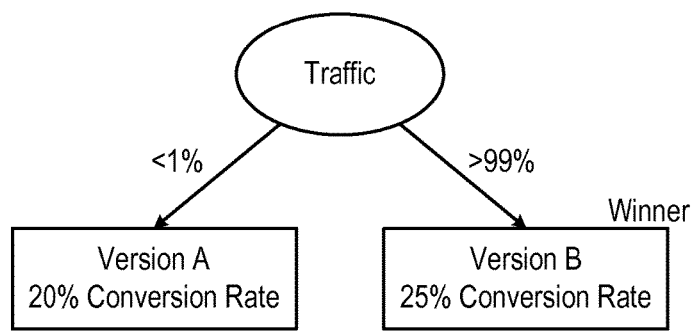
FIG. 4 is a schematic diagram of a multi-armed bandit A/B testing procedure according to embodiments of the invention at a later stage than FIG. 3 showing convergence on one offer almost exclusively.

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information transitory or non-transitory or processor-readable storage medium that may store instructions, which when executed by the processor, cause the processor to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term "set" when used herein may include one or more items unless otherwise stated. Unless explicitly stated, the method embodiments described herein are not constrained to a particular order or sequence. Additionally, some of the described method embodiments or elements thereof can occur or be performed in a different order from that described, simultaneously, at the same point in time, or concurrently.

Some known multi-armed bandit systems rely on the assumption that the response rates of each of the available offers do not change over time. In some situations this is not a valid assumption over anything but very short time periods. There are several ways response rates can change over time, for example:

Gradual drift, e.g. the attractiveness of various page designs may change with the season e.g. for a clothing retailer. If a bandit system is able to adjust with the minimum of delay this can help to ensure that at all times the best choices are being made.

Sudden change, e.g. for a bank the behavior of visitors may change dramatically e.g. after an interest rate rise where loans products become far less attractive. Again in this scenario it may be useful for the system to be able to adjust with the minimum of delay.

Regular variation, e.g. variation by day of the week for e.g. a retailer. Starting a bandit system on different days of the week may result in a different "best" offer being selected if the system converges before a whole week's data is seen. This is probably the most common failure of known bandit systems.

Figure 5:
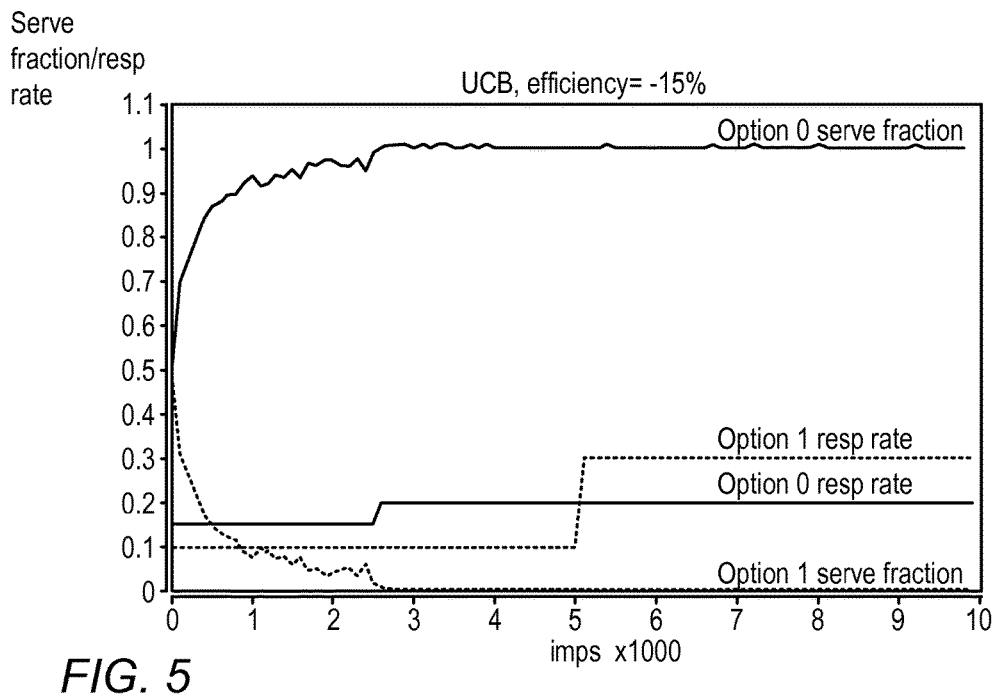
FIG. 5 is a graph showing the result of a multi-armed bandit according to embodiments of the invention failing to adapt to a step change in response rate.

FIG. 5 is a graph showing variations in response rates and serve fractions versus number of impressions or serves of two offers or options, using an example of a multi-armed bandit algorithm (in this case a UCB algorithm). The dotted light colored lines represent the response rates over time. The dark (non dotted) lines represent the fraction of serves of each offer. The graph shows the algorithm failing to adapt to a step change in response rates. In this diagram there is a major change in the response rate of option 1 half way through the run. The total run length is 10,000 impressions. For the first 5,000 impressions the best offer, determined by highest true response rate, is option 0. It can also be seen that the algorithm very quickly starts to preferentially select option 0 (denoted by the solid darker line). By the 5,000th impression the bandit is serving option 0 more than 99.9% of the time.

At impression 5,000 the response rate of option 1 suddenly jumps and it becomes the best option (light dotted line). The algorithm fails to respond to this change and continues to serve option 0 almost exclusively. The efficiency of the algorithm can be measured in a number of ways, for example:

Efficiency:

$$(rr\_actual - rr\_random)/(rr\_best - rr\_random), \text{ where:}$$

rr_actual is measured response rate rr_best is best possible response rate if the optimal choice was always made.

rr_random is the response rate if choice of option was always made randomly.

If every serve is made randomly, efficiency will be 0%. If every serve is the best possible, efficiency will be 100%. Other ways of measuring efficiency will be known to those skilled in the art. The efficiency noted in FIG. 5 is −15%, that is worse than simple random distribution between the two offers, because of the failure to respond to the change in response rate.

The consequence of this kind of failure is that to employ bandit algorithms in practice, either convergence on the wrong offer may be accepted as a risk, or the efficiency of the bandit approach may be compromised, for example by serving a fixed fraction of additional exploratory serves in the background known as exploration, to produce a more robust, e.g. adaptable to changes, solution.

Embodiments of this invention may be used to improve bandit algorithms when used in the real world for A/B testing. Embodiments of the invention may use one or both of two techniques.

A first technique relates to the calculation of current response rate to an offer. This may also be referred to as "change detection". The term "change detection" is used to refer to a technique that may be used according to embodiments of the invention to improve the responsiveness of A/B testing to changes in response rate. This technique may be used in the selection an offer from a set of offers to be served.

Embodiments of the invention provide a method of calculating a current response rate at a point in time to an offer that is served, sent or provided multiple times to one or more respondents. The method may be carried out by one or more processors, for example in a computing system and may comprise obtaining estimates of response rate in successive iterations of response rate estimation each estimate being determined over a period of time ending at said point in time, and each estimate being determined over a larger period of time than the previous estimate (except for the first, for which there may be no previous estimate). A range of uncertainty may be determined, for example for each iteration, defined by upper and lower bounds for the estimates of response rate, with at least the first of said estimates being within the range of uncertainty. For example, the upper bound or lower bound or both may be derived from the standard error of the response rate estimation. Each estimate of response rate may be compared to the upper or lower bound, or both. The results of the comparing may be used to select one of the estimates as the current response rate. This may be for example by selecting as the current response rate the first estimate that is outside or equal to one of the bounds of uncertainty, or the response rate estimated previous to said first estimate, or a response rate, e.g. the first obtained response rate, that is within a predetermined margin of one of the upper and lower bounds.

According to embodiments of the invention the upper and lower bounds may be the maximum lower bound and minimum upper bound one or both of which are determined at previous iterations of response rate estimation. In other words they may be the maximum and minimum respectively of previous determinations of lower and upper bound.

According to embodiments of the invention, in order that each estimate is determined over a greater time period than the previous one, the time period between successive response rate estimations may be incremented, for example by a time unit or by number of serves.

The obtaining of estimates may cease after obtaining the selected estimate or the first estimate that is outside said range of uncertainty.

Embodiments of the invention may be used to detect a change in rate of response to one or more offers. For example, the time period corresponding to the selected estimate may be used to estimate when a change in response rate occurred.

Methods of calculation of response rate according to embodiments of the invention may be used in the selection of one offer to be served from a set of offers. A method of selecting an offer to be served from or amongst a set of offers may comprise determining for each offer of the set of offers a current response rate corresponding to the current time, according to for example any of the methods described herein, and using the determined current response rate to select which offer of the set of offers to serve. The selection may be in response to receiving a request for a selection of an offer from the set of offers and may be followed by outputting a signal identifying the selected offer to cause the selected offer to be presented to a respondent.

Figure 19:
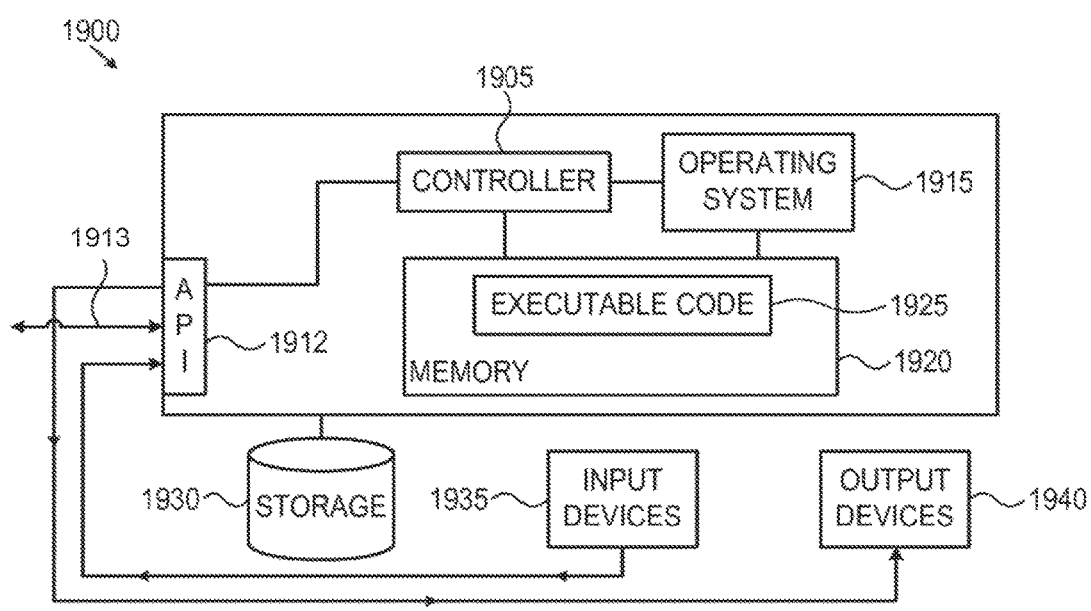
FIG. 19 is a schematic diagram of components of a computing device that may form a computing system, e.g. A/B test server, according to embodiments of the invention.

Embodiments of the invention may provide a system for determining a current response rate at a point in time to an offer that is served multiple times to one or more users. The system may comprise a data store (e.g., a memory, storage, disk drive, etc., for example as shown in FIG. 19) logging or storing serves of the offer prior to the point in time, and corresponding responses; and one or more processors configured to use data in the data store to perform operations according to methods described herein such as performing successive iterations of response rate estimation; determining a range of uncertainty; comparing each estimate of response rate to one or both of the upper and lower bounds; and from the comparison selecting one of the estimates as the current response rate.

According to some embodiments, the one or more processors may be further configured to carry out said estimation, determination, comparison and selection to determine current response rates for each offer of a set of offers; receive a request for a selection of one offer of the set of offers; and use the current response rates to select one of the offers.

According to some embodiments, said using the current response rates to select one of the offers comprises: for at least one of the offers of the set of offers determining a corresponding serve proportion that depends on the current response rate; and using a random selection process to select an offer to be served in which the determined serve proportion is used as a weighting factor for the corresponding offer.

A second technique also relates to the selection of one offer from a set of offers. Embodiments described herein are termed "even exploration" to refer to a technique for offer selection that may be used according to embodiments of the invention to improve the efficiency of a process using exploration.

Embodiments of the invention provide a method of selecting an offer to be served amongst a set of offers comprising for at least one offer of the set of offers, determining a corresponding serve proportion; and using a random selection process to select an offer to be served. In the random selection process, the determined serve proportion may be used as a weighting factor for the corresponding offer.

The determination of serve proportion may be performed before each selection of an offer or at regular intervals of for example time or number of serves. According to some embodiments of the invention, the selection may be such that if the random selection process selects an offer for which a serve proportion has been determined, the selected offer is served. Conversely, if the random selection process does not select an offer for which a serve proportion has been determined, a further selection process may be used to determine which offer of said set of offers is to be served. The further selection process may be a known process such as one that relies on UCB. Then an offer determined by said further selection process is the one that is served.

According to embodiments of the invention, the offer with the highest response rate, is identified. The at least one offer for which a serve proportion is determined may then be an offer other than the offer with the highest response rate. Where there are three or more offers in the set, a serve proportion may be determined for each offer other than the one with the highest response rate.

The determination of a serve proportion may comprise determining the number of serves required to achieve an upper confidence bound "UCB" for said at least one offer that is less than or equal to the UCB for the offer with the highest response rate.

According to some embodiments of the invention, if the random selection process selects an offer for which a serve proportion has been determined, that offer is served, otherwise, e.g. if the random selection process does not select an offer for which a serve proportion has been determined, the offer with the highest response rate is served.

The determination of a serve proportion may comprise determining a required number of serves from which a statistically significant estimate of response rate can be calculated. This number may be used to determine the serve proportion.

The determination of a serve proportion may for example comprise determining the number of serves required so that the Upper Confidence Bounds in observed response rates of all offers are equal. The determined number of serves may then be used to determine the serve proportion.

According to embodiments of the invention, the determined serve proportion may be calculated as the ratio of the required number of serves to total number of serves over a time period.

Methods according to embodiments of the invention may comprise calculating respective response rates for each of the offers of the set of offers. Other methods according to embodiments of the invention may comprise receiving pre-calculated response rates. For example a method according to embodiments of the invention may be implemented in one or more processors and the calculation of response rates may be implemented in one or more other processors.

Embodiments of the invention may also provide a system for selecting an offer amongst a set of offers comprising one or processors configured to: for at least one offer of the set of offers, determine a corresponding serve proportion; and use a random selection process to select an offer to be served in which the determined serve proportion is used as a weighting factor for the corresponding offer.

Each of these techniques will be described in general terms followed by a more specific example of an implementation.

Calculation of Current Response Rate.

If response rates do not change over time then the more historical data that is used, the more accurate the response rate estimation will be. However, when response rates do change over time then using more historical data can add more noise than signal. It would therefore be useful to identify the point in the past, up to which and no further, it is optimal to use historical data for calculation of response rates. Thus embodiments of the invention provide a method of calculating a current response rate to an offer at a point in time.

Figure 6:
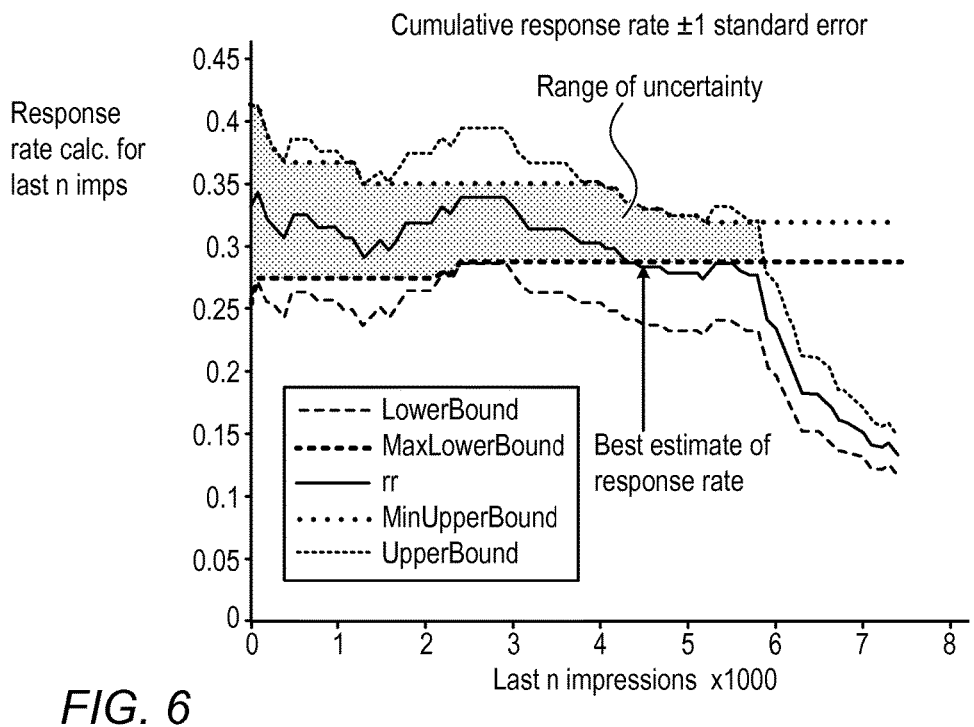
FIG. 6 is a graph showing the estimation of response rate using various amounts of historical data, according to embodiments of the invention.

FIG. 6 shows results from a real experiment aimed at estimating response rate, using various amounts of historical data. The x-axis represents a window size of historical data, measured in number of impressions. 4000 represents using the last 4000 impressions to calculate the response rate (e.g. if the traffic was 4000 impressions per week this point would represent using the last week's data).

The line denoted rr shows the estimated current response rate, using the last n impressions. So the rr line at x=4000 is the estimate of the current response rate using only the last 4000 impressions to calculate it. At x=7500 the rr line shows the estimate of the current response rate using only the last 7500 impressions. It is important to note that at all times the estimate is of the current response rate. It is not the intention in the experiment shown in FIG. 6 to determine what the response rate was last week for example. The purpose of the experiment is to determine whether data from last week is useful in the calculation of current response rate. However it should also be noted that methods according to embodiments of the invention need not be performed in real time and may be used to determine response rate at a past particular point in time, by for example determining how much data in the period leading up to that point in time is useful in the determination. Therefore references to "current response rate" should be interpreted as referring to a response rate at a particular point in time.

Referring again to FIG. 6, above and below the rr line are lines denoted "upper bound" and "lower bound" respectively. These may be used to define a range or region of uncertainty, in this example for the corresponding response rate at any point along the x-axis. The upper and lower bounds may be defined in a number of ways. In the example of FIG. 6, the upper and lower bounds are the estimated response rate plus or minus one standard error. The distance between the lower bound and the upper bound lines represents the uncertainty of the calculation. It will be noted that in the example of FIG. 6 the upper and lower bounds are determined for each estimate of response rate. Thus there is high uncertainty on the left when not many impressions have been used and low uncertainty on the right when many impressions have been used.

The experiment shown in FIG. 6 was based on different data from that shown in FIG. 5. The data was based on a simulation for which the actual response rate was known. In FIG. 6, the actual response rate was originally 0.1 and then at a point 6000 impressions ago this jumped to 0.3 and this stayed constant to the current time. Thus the correct result for the current estimate is 0.3. For some embodiments of the present invention it would be useful to be able to estimate this with the lowest uncertainty.

It should be remembered here that there is a trade-off between sample size and margin of error, or region of uncertainty. For example, if only the latest data was used, say the last 100 decisions, it is less likely that the actual response rate would have changed but the small sample size would mean that there is a large margin of error in the estimate, in this example 0.33+−0.8. If all the historical data was used there would be a large risk that the actual response rate changed over the calculation period. In this case the result would be a very precise, but wrong, estimate of 0.17+−0.02. It would be useful in some embodiments of the invention to avoid a large margin of error whilst at the same time achieving an accurate estimate.

There is clearly an optimal point, up to which using more historical data contributes to improved accuracy, and no further. In the example of FIG. 6 this is the point 6000 impressions ago when the actual response rate changed. A byproduct of embodiments of the invention is an indication of when this change in response rate occurred, which may be useful for other statistical purposes.

An example of a method according to embodiments of the invention is illustrated in FIG. 6. In general terms, starting from the left the range of uncertainty can be progressively narrowed. According to embodiments of the invention, this narrowing is not simply from repeated calculations of the range of uncertainty. Rather, the upper and lower limits for the range of uncertainty may be taken to be the maximum of previous determinations of the lower bound (estimated response rate plus margin e.g. one standard error) and the minimum of previous determinations of the upper bound (estimated response rate minus margin e.g. one standard error). The region of uncertainty is shaded in FIG. 6. When the estimated response rate leaves this region, which can be identified from the graph for example, then this may be taken to be the best estimate of response rate. More generally the identification of when the estimated response rate leaves the region of uncertainty may be used to select one of the estimates as the calculated response rate.

In FIG. 6 each estimate of response rate is determined over a period in time ending with the current time. Starting from the left, each next estimate is determined over a time period (equivalent to a number of impressions) that is larger than the previous estimate. A range of uncertainty is determined and the first estimate is within this range. In order to determine when the estimate leaves the range of uncertainty, each estimate may be compared to the upper and/or lower bounds of the region of uncertainty. The result of this comparison may be used to select one of the estimates as the current response rate.

It will be seen from FIG. 6 that according to embodiments of the invention the range of uncertainty may be determined for each estimation of response rate. This may result in a progressive narrowing of the range of uncertainty. Also according to embodiments of the invention, as shown in FIG. 6, the range of uncertainty may be further restricted by choosing as the lower bound the maximum of all of the lower bounds previously determined, e.g. lower bounds determined at previous response rate estimations. This is shown by the line denoted "MaxLowerBound" in FIG. 6. Similarly the range of uncertainty may be further restricted by choosing as the upper bound the Minimum of all of the upper bounds previously determined, e.g. upper bounds determined at previous response rate estimations.

A method of calculating current response rate according to embodiments of the invention may be represented in pseudo-code as follows:

At every calculation of offer response rate:
For i in 1:TimeHorizon
    Calc response rate (rr) from last i time units
    Calc standard error (stdErr) of rr
    UpperBound=rr+k stdErr
    LowerBound=rr−k stdErr
    Update minUpperBound and maxLowerBound
    If rr<maxLowerBound return rr
    If rr>minUpperBound return rr
Return rr
Where:
Time Horizon is a configurable parameter, setting the maximum amount of history to keep. The Time Horizon represents a time period which can also be measured in number of serves, e.g. impressions. A default value of 1 month would be reasonable for some practical applications.
Time unit defines the granularity of time. This is configurable and a default value of 1 day would be reasonable in conjunction with a one month Time Horizon.
k is a sensitivity parameter used in the definition of the range of uncertainty. A default value of 1 would be reasonable.

In the foregoing example illustrated in FIG. 6, the first estimate of response rate that is outside the range of uncertainty is chosen as the current response rate. The previous estimate, e.g. an estimate that is just inside the range of uncertainty or equal to one of the upper or lower bounds, could equally well be chosen as the current response rate. The procedure could be refined so that the estimate closest to the upper or lower bound is chosen as the current response rate. Alternatively, for example in order to reduce the required number of iterations, the first estimate that is less than a predetermined difference from one of the bounds could be chosen as the current response rate. The difference could be determined as a fraction or percentage or as an absolute difference measured by responses per impression.

It will be noted that a method of calculating response rate according to embodiments of the invention may cease once an estimate has been selected, for example after obtaining the first estimate that is outside the range of uncertainty.

Offer Selection

When measuring the response rates of different offers according to embodiments of the invention it may be desirable to ensure that there is a statistically significant difference between estimates before concluding that one is better than the other. Failure to do this may mean that an offer, e.g. the content on a web page, is changed as on occurrence of a statistical blip. To ensure the difference is statistically significant a sufficient number of, what appear to be, the poorer performing offer or offers have to be served. Only then can it be confidently assumed that the best offer has been identified.

"Exploration" usually refers to serving an offer that is not the currently observed best performing. "Exploitation" is the opposite and refers to serving the offer which is currently the best observed. Finding an efficient exploration policy is the key problem that bandit algorithms address. There are many ways of attempting to explore efficiently and algorithms using the UCB are examples of some that are theoretically very efficient.

When an A/B testing system starts, it may be exploring 100% of the time. As it gathers response data and starts to observe response rate differences between the offers, it will start to reduce the exploration and increase its exploitation of the best performing offer. The system will always continue to perform some exploration but this will be progressively reduced as the system becomes more certain that the best performing offer is indeed the best.

Figure 7A:
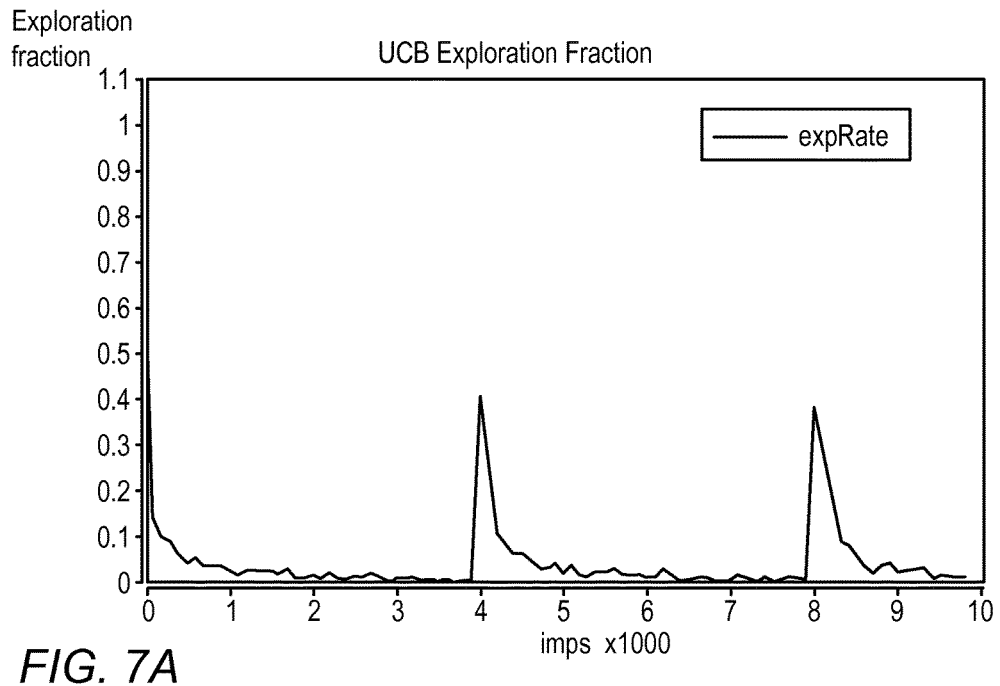
FIGS. 7A and 7B are graphs showing the effects of even exploration spreading out cycles of intense bursts of exploration, according to embodiments of the invention.

To ensure ongoing exploration and provide some insurance against changing response rates, it is common to assign a finite lifetime to each data point. In this context a data point is an impression with its associated response, or lack of response. (FIG. 7A plots an aggregate of data points.) For example, if this finite lifetime was one week, the system would be continually learning from only the last 7 days' data. In such systems, exploration may come in intense episodes, separated by longer periods of little exploration. Such exploration may in some circumstances lead to inefficiency. For example, if the burst of exploration happened in the middle of a Sunday night, this might be very unrepresentative of behavior during the rest of the week, leading to the system failing to serve the actual best offer most of the time.

According to embodiments of the invention, instead of using a fixed lifetime for the data, a variable lifetime may be assigned, for example based on the result of a method of estimating current response rate. FIG. 7A is a graph showing the relationship between impressions and exploration fraction for a single offer when data points are assumed to have a fixed lifetime, in this example 4000 impressions. (If the traffic was 4000 impressions per week on a website then this could simulate the weekly peak exploration in the middle of Sunday night.). It can be seen from FIG. 7A that after the initial exploration, the bandit quickly converges with a low level of exploration. As data exceeds its lifetime, the UCB for the poorer performing offer may increase beyond the UCB for the best offer because the response rate for the poorer performing offer is based on a smaller sample size. This leads to a sudden burst of exploration at 4000 impressions, with increased numbers of impressions of the poorer performing offer until its UCB returns to a level below that of the best performing offer. There is another peak at 8000 impressions and so on.

Examples of methods according to embodiments of the invention may spread this exploration more evenly over a time period so that the resulting response rate is more representative of the whole period. Thus embodiments of the invention provide a method of selecting an offer to be served amongst a set of offers. The set of offers might comprise only two offers, the current best performer and one alternative. For at least one offer of the set, e.g. the alternative, a serve proportion may be determined. Then serves of the alternative offer may be spread over a time period. The serve proportion may be determined so that the total number of serves of the alternative offer over the time period is sufficient to calculate a statistically significant estimate of response rate for the alternative offer.

A random process, such as a die throw, may be used in order to select which offer of the set of offers to serve next. This may be weighted according to the determined serve proportion for the offer.

An example of an "even exploration" procedure according to embodiments of the invention may be summarized as follows:

At every decision as to which offer is to be served:
    Update exploratory serve proportions "ESPs" for each offer other than the current best performer
    Throw die to decide whether to make exploratory serve according to current ESPs
    If no exploratory serve made, determine offer using usual serve selection algorithm, such as UCB, or simply serve the current best performing offer.

The updating of the ESPs may:
    Find offer with best observed response rate. Call this the best offer
    Calculate the Upper Confidence Bound (UCB) of this offer
    For each offer not the best
        Given the current observed response rate, calculate the minimum required impressions (MRI) for UCB of this offer to be <=UCB of best offer
        Calculate Exploratory Serve Proportion (ESP) =MRI/total impressions over time horizon It should be noted that the determining or updating of the ESPs can be performed at every offer selection decision. It may be less frequently, such as on alternate decisions, or on a time schedule, for example every 5 minutes. It should also be noted that the UCB for the best offer, used in the determination of ESP, may be a most recently determined UCB, determined for example as part of a procedure for determining current response rate according to embodiments of the invention.

MRI for each offer determines a minimum exploration for confidently asserting that the best is indeed the best, for example the offer with the highest response rate.

The "Time Horizon" is time period and is a configurable parameter over which the exploration is to take place. A typical value might be one week.

The MRI number of serves may be spread over the Time Horizon to ensure that sufficient ongoing exploration is taking place.

According to embodiments of the invention, this "even exploration" or method of offer selection may simply determine a lower bound for the exploration rate. Conditions may mean that the bandit algorithm used (e.g. UCB) may do additional exploration.

Figure 7B:
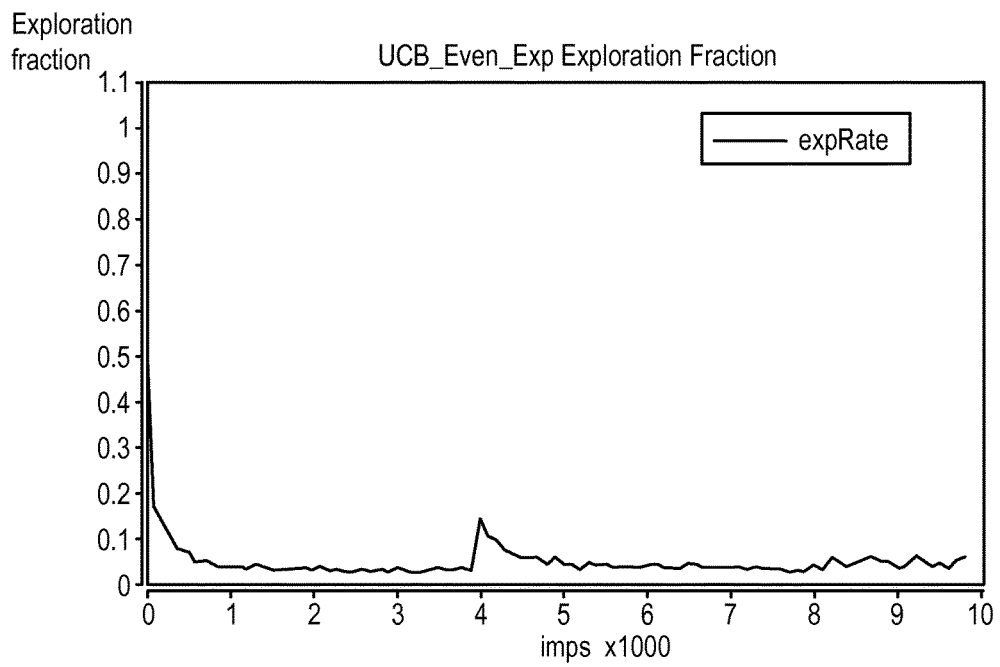

The effect of this even exploration is to spread out the same amount of exploration as used in the example of FIG. 7A throughout the cycle, making exploration more representative of average behavior. Output from a prototype using the even exploration procedure can be seen in FIG. 7B.

Methods according to embodiments of the invention may use this even exploration procedure in conjunction with a method of calculating current response rate. Thus, according to embodiments of the invention, any of the observed response rates may be calculated using the methods described herein, for example with reference to FIG. 6.

Other methods according to embodiments of the invention may use either of calculation of current response rate or even exploration without the other.

Examples of System Architecture

Figure 8A:
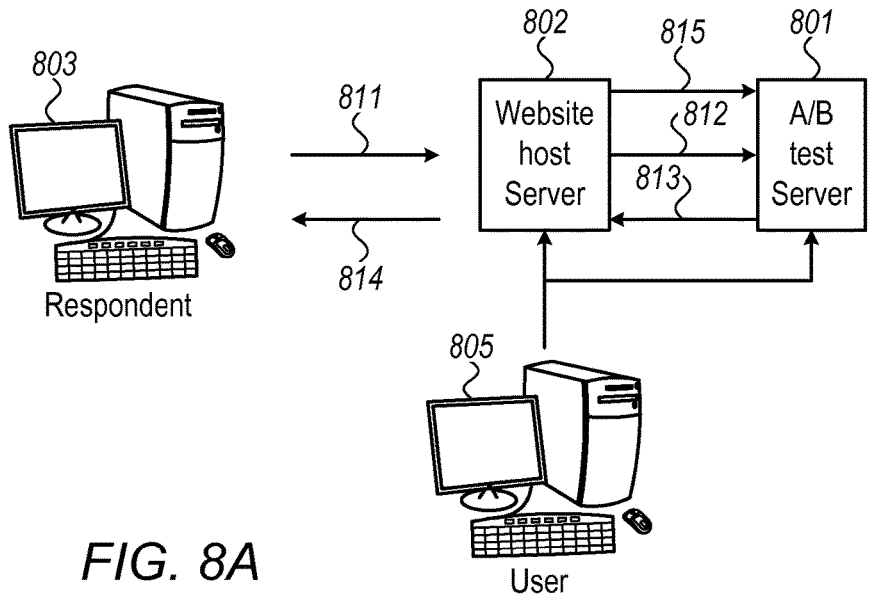
FIGS. 8A and 8B are schematic diagrams of two alternative configurations for systems according to embodiments of the invention, showing the interaction of the A/B test system with a user and a respondent.
Figure 8B:
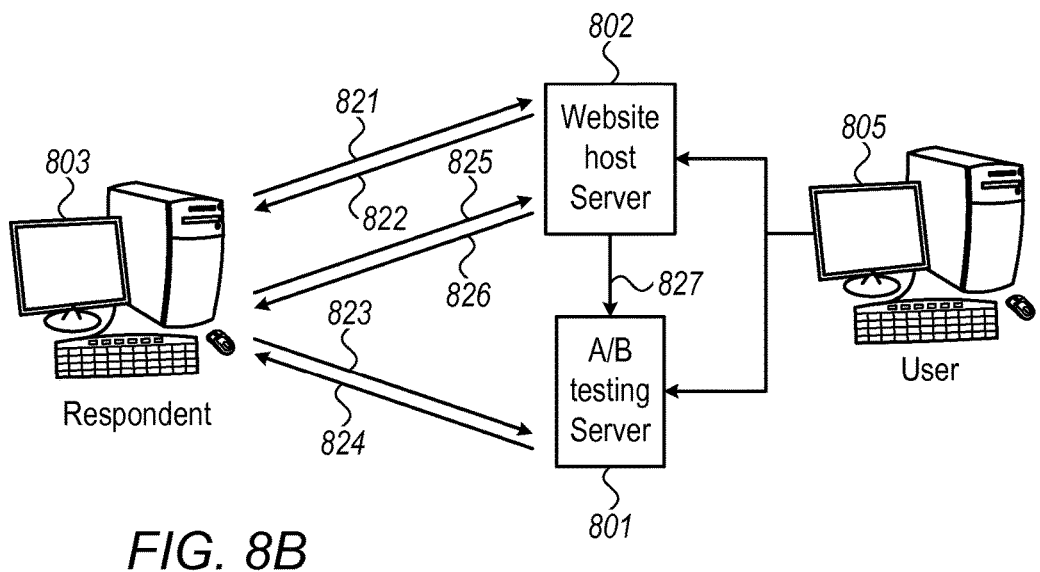

FIGS. 8A and 8B are schematic diagrams showing basic components of two alternative systems for A/B testing according to embodiments of the invention. Any of these components may include the computing system, or variations or parts of the computing system, shown in FIG. 19. Each system comprises an A/B test server 801, a website host server 802 and a respondent device 803 which in this example is shown as a personal computer. It should be noted that the servers 801 and 802 need not be physically separate or self-contained components. They could be virtual servers or services on shared servers. The components of the systems shown in FIGS. 8A and 8B may communicate with each other in any way including wired and wireless connections over one or more local, wide area or global networks. A user of the system such as the owner of the website may have access to the website host server 802, for example remote access via a user device 805 such as a personal computer, and may use this to perform tasks such as updating of information on a website. The same user may have access to the A/B test server 801 and may use this to configure A/B testing. In other embodiments of the invention the web host server may be replaced by a call centre server. In the case of a call center the respondent device may be equipment used by the call center agent who records the response of the respondent during a telephone call. It should also be noted that an A/B server may serve multiple web host servers or call centre servers or both and therefore a system according to embodiments of the invention may include one or more A/B servers each serving one or more other servers. Also a single user may require the services of more than one A/B server, e.g. for a complex website it is possible that different parts may be served by different A/B servers. Furthermore according to embodiments of the invention the functions of any two or more of the system components shown in FIGS. 8A and 8B may be combined into one computing device or spread across more computing devices according to specific system requirements.

Each of the servers 801 and 802 and the respondent and user devices 803 and 805 may comprise computing devices comprising one or more processors. An example of a suitable computing device is illustrated in FIG. 19.

Figure 9:
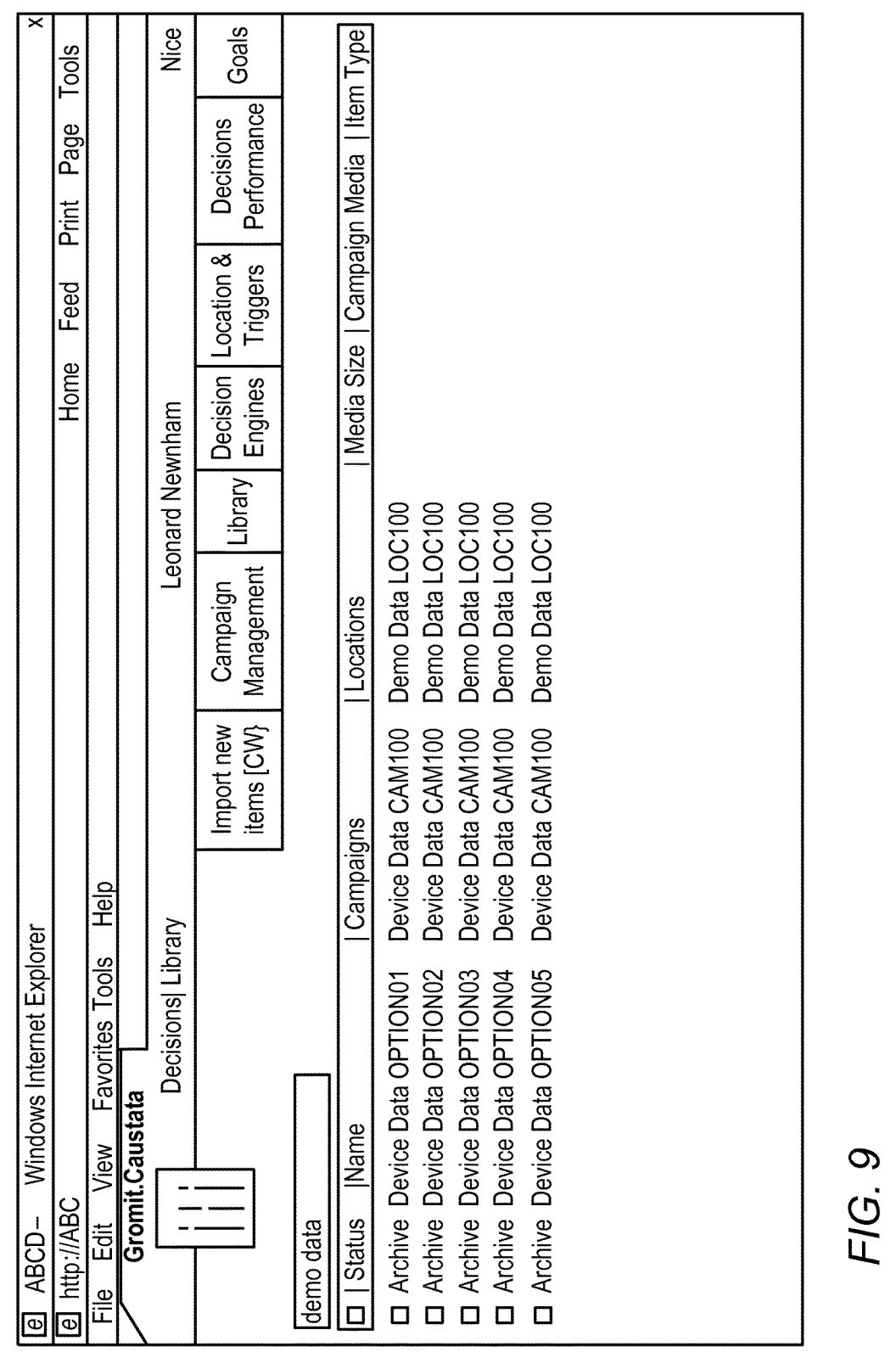

FIG. 9 is a screen shot such as might be presented to a user at user device 805 during the set-up or configuration of A/B testing, for example via a user interface "UI". In the screen shot the UI is showing 5 offers assigned to one location where the offers will be shown. The user may be for example an employee of a company that owns a website that the company wishes to optimize. The user may configure A/B testing using an application programming interface "API" running on user device 805.

A typical example of A/B testing would be optimization on a web page. Here, several variants of one part of the page may be tried and, over time, a winner may emerge and be served predominantly. For example, this could be several different wordings on a "buy now" button shown on the web page.

A/B testing configuration may be relatively simple, and may simply require the uploading of a set of offers and in some cases a location where they will be displayed. The location may be an area of a web page, a desktop application in a call centre, a cashier's till at the point of sale in a retail store, or many other things.

In the example of FIG. 9, the screen shot shows that five offers have been loaded to the A/B test server 801, denoted OPTION 01-OPTION 05, to be displayed at a location denoted LOC 100. It should be noted that these may be loaded to either server 801 or 802. During a testing process, the A/B test server 801 will receive requests for a decision as to which one of a set of offers is to be displayed. In other words the test server is requested to select an offer for the next serve. The requests may come from a variety of sources depending on the nature of the offers. They may for example come from applications, running for example on respondent devices, referred to as calling applications. The offer may be very simple and comprise for example a text string instruction to a calling application, such as a universal resource locator "url" pointing to an image.

A user may define a success criterion or goal as part of the configuration of A/B testing, to enable the A/B test to measure the success of each offer. This criterion may define what counts as a "response". This could be click-through such as clicking a particular button on a web page, sign-up for an offer, a defined multiple of sign-ups for an offer, product acquisition, revenue spent, total customer revenue over a defined period such as a number of days, or any other metric of interest. Whatever it is, whenever a respondent performs the behaviour leading to the success criterion or goal, this information may be provided to the A/B server. From the number of displays of an offer (impressions) and the number of times the user reacted in the desired way (responses), the system, e.g. one or more processors in the A/B test server 801, can measure the response rate (responses/impression) for each offer and thereby rank the performance of each offer.

FIGS. 8A and 8B are two system diagrams showing the interaction of an A/B test system with a user and a respondent according to embodiments of the invention. Two modes of operation are illustrated. In FIG. 8A the request for an offer comes from the website content management system. In FIG. 8B it comes from the browser during a page loading process.

Referring to FIG. 8A, possible information flows between the system components according to embodiments of the invention may be as follows:

811—a browser application running on the respondent device 803 requests a page from a website hosted by website host server 802

812—the website host server 802 sends a request to the A/B test server 801 for a decision as to which offer to serve 813—in response to the request, the A/B test server 801 returns a decision to the website host server 802, this may be in the form of a url identifying a web page 814—in response to receiving the selection, the website host server 802 returns the complete web page selected by the A/B test server 801 to the browser at the respondent device 803

815—response data is collected by the website host server and fed back to the A/B test server 801 for use in future decision making.

In the foregoing example, the content of each offer is stored at the website host server 802 and the A/B test server 801 simply uses identifiers for each offer. It is also possible according to embodiments of the invention for the content to be stored at the A/B test server 801.

Referring to FIG. 8B, possible information flows between the system components is as follows, for an example where the offers comprise different variations of the same webpage:

821—a browser application running on the respondent device 803 requests a page from a website hosted by website host server 802

822—website host server 802 returns the page with an embedded tag identifying a variable part of the page 823—when the page renders the tag signals the browser at respondent device 803 to request the A/B server for a decision as to which offer to serve 824—in response to the request, the A/B test server 801 returns an offer decision to the respondent device 803 This may be the actual content displayed or a reference to the actual content 825—If the respondent device 803 has received a reference to the actual content it sends a request back to the website host server 802 for the content to display in the variable part of the page 826—in response to a request from the respondent device 803, the website host server 802 returns the content so that the complete page can be rendered by the browser on the respondent device 803

827—response data is collected by the website host server 802 and fed back to the A/B test server 801 for use in future decision making.

It should be noted that from the point of view of the respondent or other operator of respondent device 803 such as a call center agent, the communication between the website host server 802 and the A/B test server 801 is invisible and the respondent or call center agent, for example, may not be aware that this is happening.

During an A/B testing process, users may have displayed or otherwise presented to them various offers as they interact with some third party, for example via an application, interactive voice response "IVR" system or personal to person call or in any other way. Whether or not they interact with this content (e.g. click through, go on to acquire something, or however the success criterion has been defined) this may be recorded by or recorded and sent to an A/B test server implementing systems and methods according to embodiments of the invention. A system according to embodiments of the invention may learn that one offer is more successful than the rest and may then serve that offer preferentially in future. Therefore future users, or the same users coming back, may have an improved experience. Methods and systems according to embodiments of the invention may lead more users to an improved experience more quickly and/or in a more reliable way.

A suitable architecture for a system according to embodiments of the invention will now be described in more detail.

Figure 10:
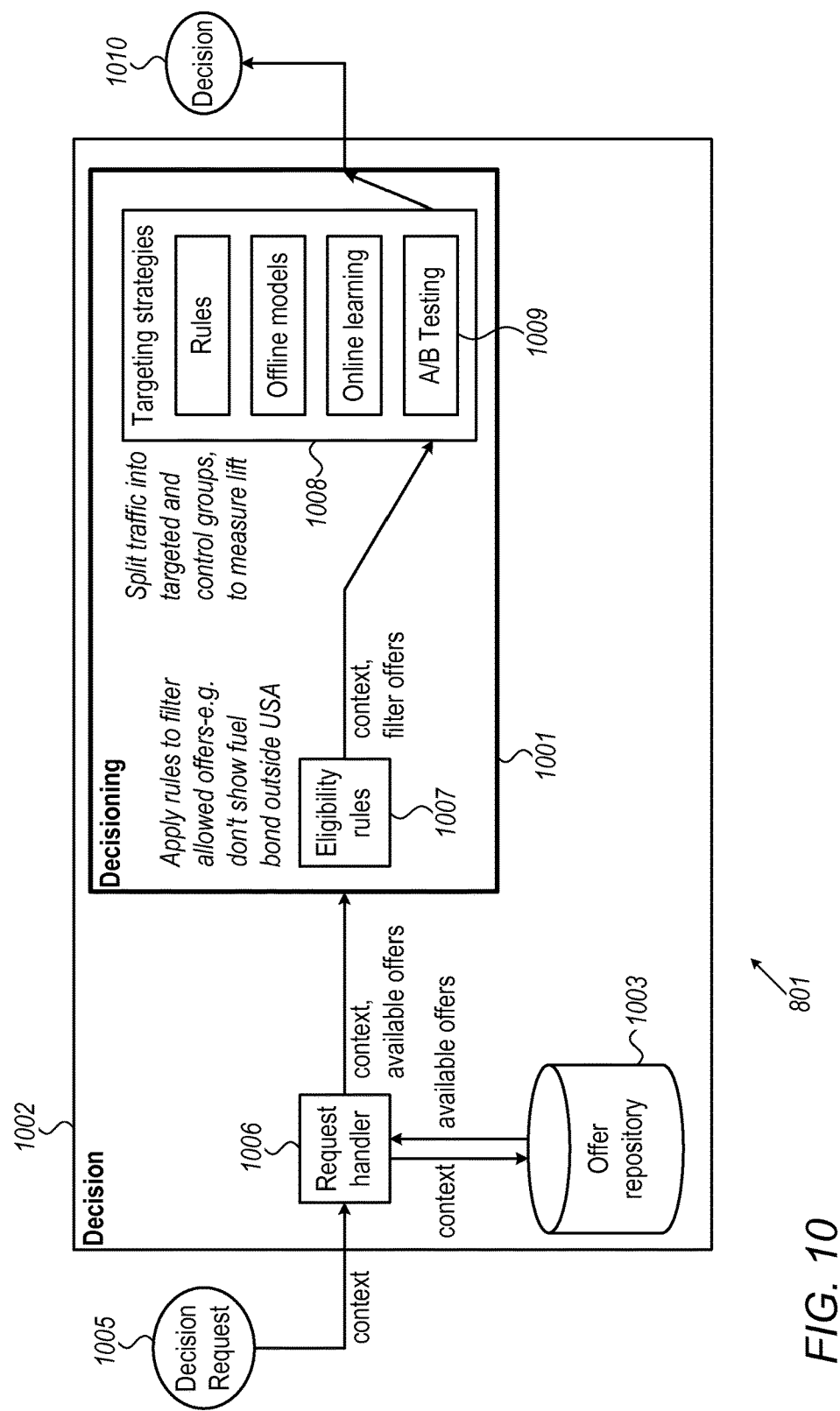
FIG. 10 is a schematic diagram showing components of an A/B test server according to embodiments of the invention.

FIG. 10 is a diagram showing high level components that may be included in an A/B test server according to embodiments of the invention. These include a decisioning platform 1001 that operates within a data capture platform 1002. Each platform 1001 and 1002 comprises software operating on one or more processors or hardware comprising one or more processors or a combination of hardware and software defining an operating environment in which other platforms or applications may operate. For example, the decisioning platform 1001 according to some embodiments is a platform within which a plurality of different applications may operate, including an A/B testing application. Thus, the decisioning platform 1001 may be configured for many decision making scenarios other than A/B testing which are not described herein. The platforms 1001 and 1002 may for example be implemented as executable code stored in memory 1920 of a computing system as shown in FIG. 19 to be executed by one or more processors, for example in controller 1905.

The decisioning platform listens for requests for a selection of an offer from a set of offers, or Decision Requests. Decision Requests 1005 may be received for example from a website host server such as server 802 or a respondent device such as device 803. Decision Requests 1005 may be received via an API—and may contain a location. This may be different from the location that is used in the configuration of the A/B test and may for example be a geographical location. This location is referred to as the "context". Decision Requests 1005 are received by a request handler 1006 which in the embodiment illustrated in FIG. 10 is part of the data capture platform 1002. The request handler 1006 may then use the context, if provided, to retrieve all eligible offers for that context. In the example of FIG. 10 according to embodiments of the invention the offers may be stored in an offer repository 1003 which may be part of the data capture platform 1002. Offer repository 1003 may store only identifiers for multiple offers. These may be stored in sets, each set corresponding to a location as defined in the configuration of the A/B test. Thus each set may comprise a plurality of alternative offers for a particular location. The retrieved offers are then supplied to an eligibility rules filter 1007 which may be part of the decisioning platform 1001. The retrieved offers may then be then filtered by eligibility rules. For example there may be restrictions on what offers are available for users in different geographical locations (contexts). An example of such a restriction is a requirement not to display alcohol advertisements in certain US states.

A targeting strategy may then be applied to the set of filtered offers, for example using one or more targeting applications. This may be applied in a targeting strategy module 1008 which is comprised in the decisioning platform 1001. There are several available strategies and corresponding modules illustrated in FIG. 10 including rules, offline models, online learning and A/B testing. Each module may run a specific application such as an A/B testing application. The present description is only concerned with A/B testing. Thus according to embodiments of the invention, a set of offers, which may be filtered, is received and one of these is selected for example according to an A/B testing strategy, for example using an A/B testing application running in A/B testing module 1009. Once a selection has been made, e.g. an offer has been chosen e.g. using the A/B testing module 1009, a decision 1010 such as an offer or an identification of an offer may output, for example from the data capture platform 1002. The decision 1010 may be in the form of a signal identifying the selected offer to cause the selected offer to be presented to a respondent. The chosen offer may then be returned, for example to a calling application running on a respondent device 803, either directly or via a website host server for example according to the flows of FIG. 8A or 8B. The offer may then be displayed or otherwise presented to the respondent.

Figure 11:
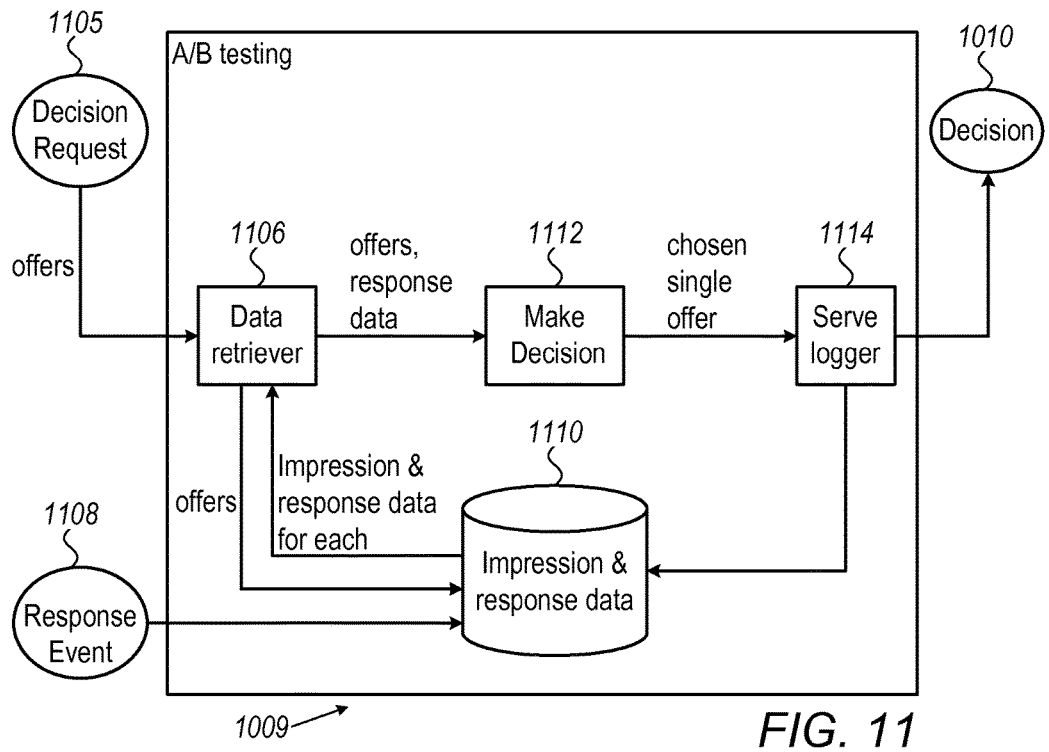
FIG. 11 is a schematic diagram showing components of an A/B testing module according to embodiments of the invention.

FIG. 11 shows an example of an A/B testing module 1009 suitable for systems according to embodiments of the invention. The module 1009 shown in FIG. 11 may receive a request comprising a set of offers, for example output from an eligibility rules filter 1007 as shown in FIG. 10. This request may be output to a data retriever 1106. The data retriever may then retrieve impression and response data for each offer from an event repository 1110 which has been supplied with response event data 1108. This retrieved impression and response data is then output from data retriever 1106 and loaded to make decision module 1112 which may be part of the A/B testing module 1009. This data may be aggregated by time unit, e.g. by day.

The make decision module 1112 may then make a decision and output a selection of one of a set of offers. Once a single offer has been chosen or selected in the make decision module 1112, the decision 1010 may be output. In addition an impression of the chosen or selected offer may be logged in the event repository 1110, for example by server logger 1114.

Response event data may be supplied to the event repository 1110 independently of the decision making process and added to the impression and response data. In the examples shown in FIGS. 8A and 8B, this is received from the website host server 802. According to other embodiments of the invention this event data could be supplied from other places depending on the goal and/or other configuration parameters of the A/B test. Examples include but are not limited to:

If the goal is click-through, the click-through page could be tagged to cause the sending of an event to an A/B server, for example from the website host server 802 or the respondent device 803, in much the same way as services such as Google Analytics record pageviews, in real-time.

If the goal was revenue within the next three days, the user (e.g. a company running a website) may send a batch of events from a website host server, for example periodically such as every night, created from the company's records.

Thus the event repository may store impression and response data for each offer.

Figure 12:
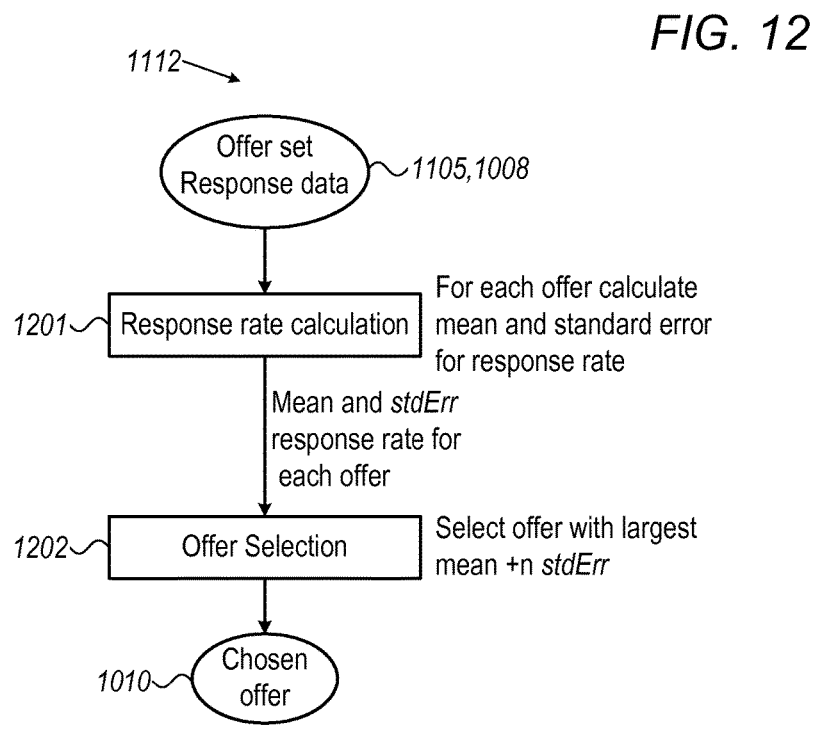
FIG. 12 is a flow chart showing operations performed in the making of a decision according to embodiments of the invention.

FIG. 12 shows a series of operations that may be performed as part of the decision making process performed in make decision module 1112 according to embodiments of the invention, taking in this case the example UCB multi-arm bandit algorithm.

In the embodiment illustrated in FIG. 12 there are two stages, response rate calculation 1201 and offer selection 1202.

Response rate calculation may be performed for example as follows (other or different operations may be used): Over history, or some window of history, both the response rate and the standard error of that response rate may be calculated. The response rate may represent the best guess of the actual response rate from the available data, for example calculated using a method response rate calculation according to an embodiment of the invention. The standard error may be used as a measure of uncertainty in that calculation. The more data points that are used in the calculation, the smaller will be the uncertainty of the calculation, provided that there is no change in the underlying response rates over time.

Offer selection may be performed as follows. A UCB algorithm may compare offers by adding some component of the uncertainty of the response rate calculation. For example a confidence bound for response rate may be determined based on some measure of the certainty of the response rate. This might simply be:

$$ucb = rr + k * StdEr$$

where rr is response rate and k is a constant, for example 1. A UCB algorithm may then simply choose the offer with the largest UCB value. This will ensure that offers that have little data may be preferentially served until enough data is available to be able to reliably distinguish between them.

Embodiments of the invention may modify one or both of both these stages in order to make them more robust against change over time.

Response Rate Calculation—Example Flow Chart

Methods of response rate calculation according to embodiments of the invention will now be described with reference to FIG. 13.

Figure 13:
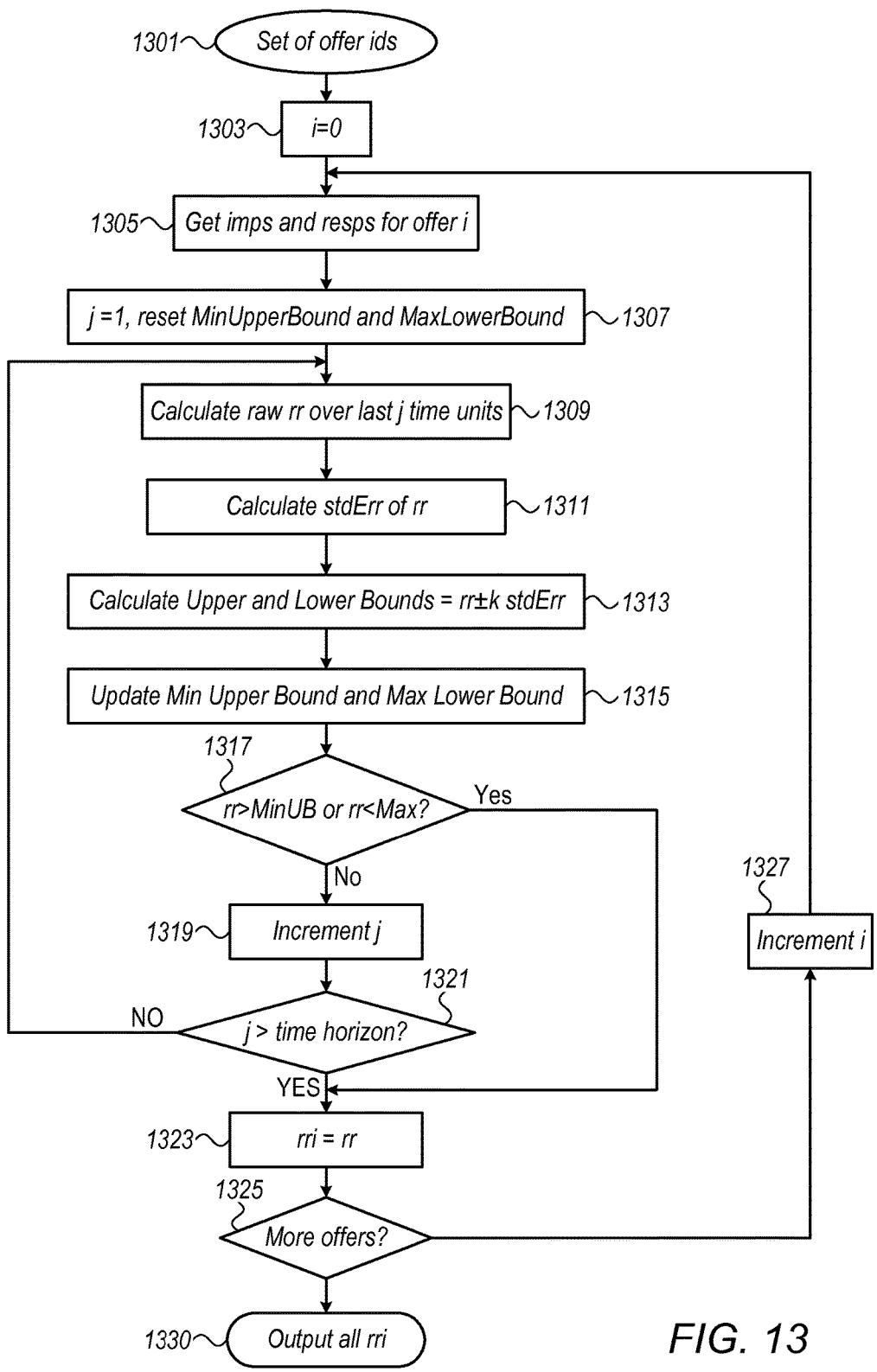
FIG. 13 is a flow chart showing operations performed in a method of response rate calculation according to embodiments of the invention.

The particular method illustrated in FIG. 13 may be implemented as an algorithm running in an A/B testing module such as module 1009. The purpose of the process shown in FIG. 13 is to get as accurate an estimate as possible of the probability of the user responding to each of the offers. If this is done in real time, the only data available is historical data and some of the older data may add more noise than signal. The method illustrated in FIG. 13 determines the point in the past, up to which and no further, historical data is reliable. It may therefore be used to detect a past point in time at which a change in the response rate occurred and is therefore referred to herein as change detection.

In FIG. 13 the following definitions are used:

i is a counter iterating over all offers j is a counter iterating over time periods imps is the number of times an offer has been server over a time period, for example a number of impressions resps is the number of responses received for an offer over a time period rr is response rate raw rr is resps/imps and denotes one of a number of estimates of response rate from which one is selected as the calculated current response rate, thus the expressions "raw response rate" and "estimated response rate" are used interchangeably rri is the best estimate of the response rate to offer i and is the output of the algorithm, also termed the "calculated response rate" for a particular point in time StdErr is the standard error Upper Bound is rr+k StdErrs, where k is a configurable constant Lower Bound is rr—k Std Errs Min UB is the minimum of all upper bounds seen for this offer Max LB is the maximum of all lower bounds seen for this offer Time Horizon is a configurable parameter representing the maximum period over which to calculate response rate for an offer The flowchart of FIG. 13 is now described in detail, with the text in each box displayed in italics, accompanied by an explanation. In the following an example is used where the time unit is days.

Set of Offer Ids.

The input to the process at operation 1301 is a set of offers, or identifications "ids" for the set of offers. The offers may be interchangeable one for the other, for example different versions of a webpage or a sentence to be read out by a call center agent. The offers may be allocated a set of integer values, i=0 . . . i=n−1, where n is the number of offers in the set of offers.

i=0.

At operation 1303 the i counter is set to zero. In subsequent operations the illustrated process will iterate over the set of offers, determining a best estimate response rate for each.

Get Imps and Resps for Offer i.

At operation 1305, for the offer i as defined in operation 1303 all historical data is retrieved for that offer. This may consist of impressions and responses by time unit (in this example, by day) or by number of impressions, which is in effect a variable time unit. In the embodiment shown in FIG. 11 this data is stored in event repository 1110.

j=1, Reset MinUpperBound and MaxLowerBound.

At operation 1307 a counter is started which is later incremented in units of time or number of offers defining the historical period over which an estimate of response rate is determined. Each historical period ends at a point in time for which the current response rate is to be calculated. By incrementing j, the process iterates back over time units, starting with the current time unit only. Thus each iteration of response rate estimation is determined over a period of time ending at the point in time for which the calculation of response rated is being made, with each estimate being determined over a larger period of time than the previous estimate (except possibly for the first estimate). If j is incremented one day at a time and the estimation is being carried out in real time, the first iteration of response rate estimation will be for only today's data. The second iteration, the last 2 days' data. The third iteration, the last 3 days' data, and so on. Also at operation 1307 MinUpperBound and MaxLowerBound are initialised. In subsequent iterations of the particular flow shown in FIG. 13, the upper and lower bounds may be used to narrow down the range of uncertainty for the response rate estimation for each offer. For the first iteration MinUpperBound and MaxLowerBound may be set to +infinity and −infinity, for example.

Calculate the Raw Response Rate Over the Last j Time Units.

At operation 1309, a raw response rate, or estimate of response rate is obtained as resps/imps. So, in the first iteration of operation 1309, TotalResponsesToday/TotalImpressionsToday is calculated. In the second iteration: TotalResponsesLast2Days/TotalImpressionsLast2Days.

Calculate Standard Error of rr.

Standard error is a standard statistical quantity calculated from the impression and response data and is determined at operation 1311.

Calculate the Upper and Lower Bounds.

At operation 1313 the upper bound is calculated as the raw response rate plus k standard errors. k is a configurable constant and 1 is s suitable example of a default value. The lower bound is similarly calculated at operation 1313.

Update MinUpperBound and MaxLowerBound.

At operation 1315 MinUpperBound is determined as the minimum of the values of the upper bound calculated in the previous iterations of the operations 1311 and 1313. MaxLowerBound is similarly calculated. According to embodiments of the invention, these minimum and maximum values are used as the upper and lower bounds for a range of uncertainty for the response rate estimation, rather than simply the current upper and lower bounds.

rr>minUB or rr<MaxLB?

At operation 1317 according to embodiments of the invention, each estimated response rate is compared to one or both of the upper and lower bounds of the range of uncertainty, which may be defined in operation 1315 by the minimum and maximum respectively from previous estimations. According to embodiments of the invention, this comparison is used to determine whether the estimated response rate is within the range of uncertainty. Successive determinations of MinUpperBound and MaxLowerBound may have the effect of narrowing down the range of uncertainty around the best estimate of actual or current response rate. Once the estimate or raw rr moves outside this range then according to embodiments of the invention, older historical data is deemed to be adding more noise than signal and is not used. So, if the condition of operation 1317 is true, in other words the estimate or raw response rate is outside the range of uncertainty, no subsequent iterations take place for the current offer and the flow proceeds to operation 1323 setting rri, assumed to be the best estimate response rate for offer i, to the current raw response rate value. Thus the response rate has been calculated by using the results of the comparison at operation 1317 to select an estimate, or rr as the current response rate, according to embodiments of the invention. This calculated response rate may then be used in an offer selection process.

Increment j.

If the condition of operation 1317 is not met, the flow proceeds to operation 1319 where j is incremented to increase the time period, either in units of time or number of impressions or serves. Thus in the next iteration of the loop comprising operations 1309-1317 the raw response rate is calculated and all other parameters updated, with an additional day's data.

j>Time Horizon?

At operation 1321 a check is made that a maximum time horizon has not been reached. This is a configurable parameter for increments of one day a suitable value for j would be 1 month. If the condition at operation 1321 is not true, a new iteration of response rate estimation takes place over the next time period repeating operations 1309-1321. If the condition at operation 1321 is true, the estimation of response rate for that offer stops and the estimated response rate is set to equal the current raw response rate.

In the embodiment of the invention illustrated in FIG. 13, the first estimated response rate that is outside the range of uncertainty is chosen or output as the calculated response rate. According to other embodiments, the previous estimate, e.g. the last estimate that is within the range of uncertainty or equal to one of the bounds, may be output as the calculated response rate. According to other embodiments, the calculated response rate may be the first estimated response rate that is within a predetermined margin of the upper and lower bounds of the range of uncertainty.

More Offers?

At operation a 1325, a check is made to determine whether there are any more offers to process. If yes, i is incremented and operations 1305-1323 are repeated for the next offer. Thus for example operation 1305 is repeated in subsequent iterations for different values of i so that eventually response rate calculation is performed for each offer.

Output all rri.

If there are no more offers, the flow ends at operation 1330 exiting with a full set of best estimate response rates, or calculated current response rates, one for each offer Thus the output is the list of best estimate response rates.

The flow of FIG. 13 may be iterated or repeated at regular intervals to determine new best response rates.

Offer Selection—Example Flow Charts

Methods of offer selection according to embodiments of the invention will now be described with reference to FIGS. 14 and 15.

Figure 14:
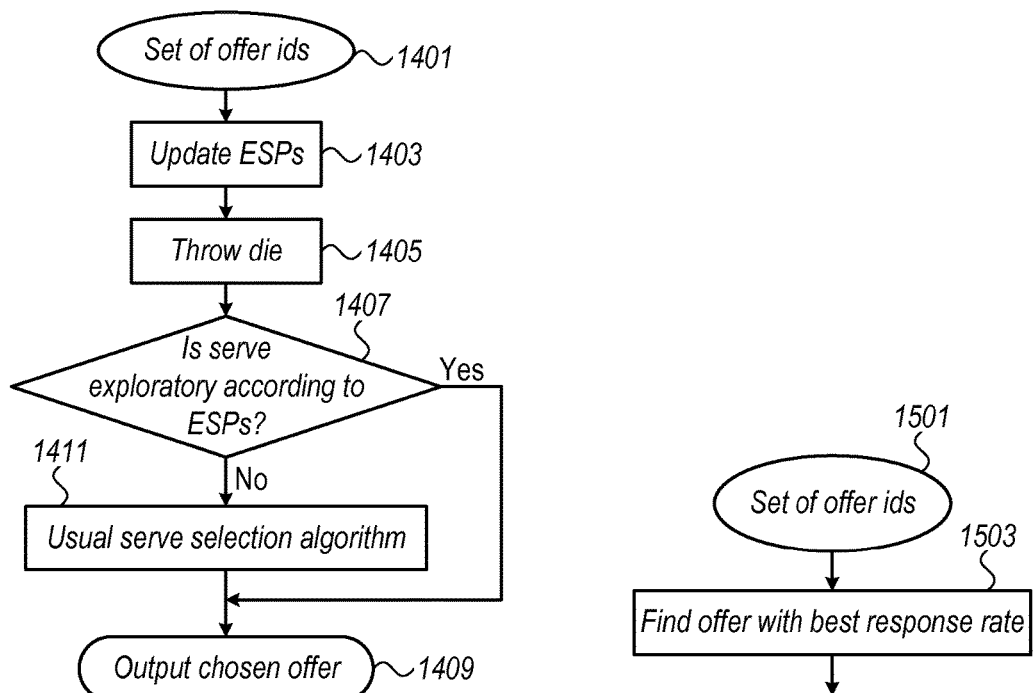
FIG. 14 is a flow chart showing operations performed in a method of offer selection for even exploration according to embodiments of the invention.

FIG. 14 shows a flowchart illustrating offer selection for the purpose of even exploration according to embodiments of the invention. The purpose of the even exploration process is to spread exploration evenly over time. To do this, according to embodiments of the invention, an exploratory serve proportion (ESP) may be determined for at least one offer in a set of offers, for example at least one offer that is not the best performing offer, and for a set of more than two offers, each offer that is not the best performing offer.

According to embodiments of the invention, at every serve a random number is generated, equivalent to a throw of a die, to determine whether any offer is to be served as an exploratory serve. The exploratory serves are then selected according the serve proportions. Any other suitable manner for randomly distributing exploratory serves may be used. If no exploratory serve is selected then the serve is determined by a default offer selection algorithm, such as an algorithm that uses the UCB for selection.

Figure 15:
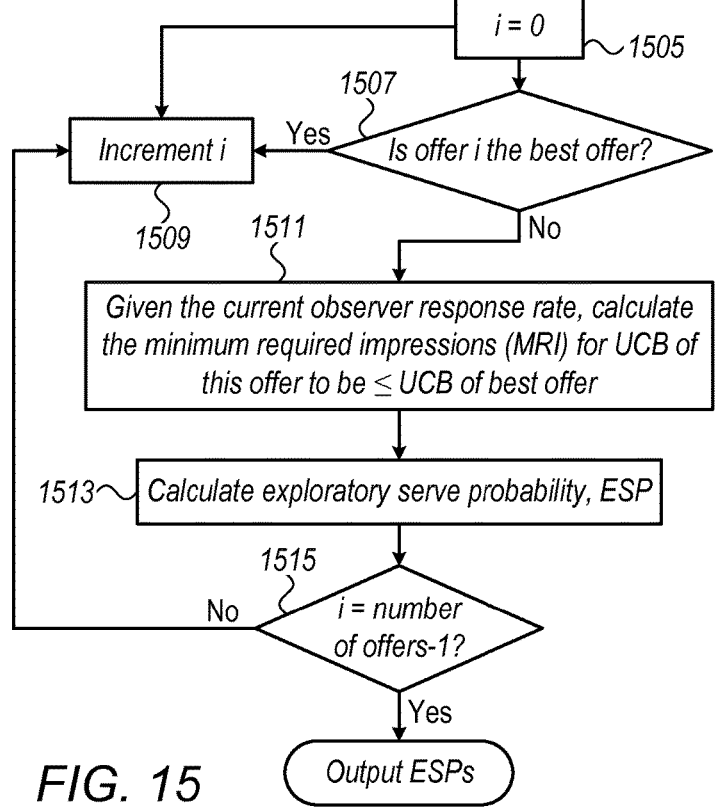
FIG. 15 is a flow chart showing operations performed in a method of calculation of exploratory serve proportion according to embodiments of the invention.

The flowcharts shown in FIGS. 14 and 15 are now described in detail, with the text in each box displayed in italics, accompanied by an explanation.

The particular methods illustrated in FIGS. 14 and 15 may be implemented as an algorithm running in an A/B testing module such as module 1009.

Set of Offer Ids.

At operation 1401, similarly to operation 1301, the input to the process shown in FIG. 14 is a set of offers or offer ids. The offers may be interchangeable one for the other, for example different versions of a webpage or a sentence to be read out by a call center agent. The offers may be allocated a set of integer values, i=0 . . . i=n−1, where n is the number of offers in the set of offers.

Update ESPs.

The next operation 1403 in FIG. 14 is to update or determine ESPs. A possible method for determining ESPs according to embodiments of the invention is illustrated in FIG. 15. In the flow of FIG. 14 it is assumed that ESPs are determined for multiple offers but in other embodiments of the invention only one ESP may be determined, for example an ESP for an offer that is not the best performing offer, for example in a set of two offers. Thus, according to embodiments of the invention, at operation 1403, for at least one offer of a set of offers a corresponding serve proportion is determined. According to some embodiments an ESP is determined for each offer and according to other embodiments an ESP is determined only for those offers other that the one with the highest response rate. The flow then proceeds to operation 1405.

Throw Die.

At operation 1405 a die is thrown or the equivalent is performed by using a random number generator to output a value r between 0 and 1. This is part of a random selection process to select one of the offers. In this embodiment of the invention, the one or more ESPs determined at operation 1405 are used as weighting factors in the selection process, for example at operation 1407.

Is Serve Exploratory According to ESPs?

At operation 1407, the die or randomly generated number is used together with the ESPs to determine whether to force this serve to be exploratory and if so which offer to serve.

The exploratory serves are selected randomly in proportions determined by their respective ESPs. There are several ways in which this can be achieved and the following is one example.

An example set of offers may comprise for example three offers, o1, o2, o3 and o4, with o4 having the highest response rate and the other offers having exploratory serve proportions of 0.1, 0.05 and 0.01, respectively for offers o1-o3. The remainder for each proportion, up to 1, is the proportion of serves of that offer that are not exploratory. Thus, for offer o3 the proportion a non-exploratory serves is 1-0.01=0.99. For example, the decision at operation 1407 could be:

if r<0.1 serve o1 as an exploratory serve
if 0.1<r<0.15 serve o2 as an exploratory serve
if 0.15<r<0.16 the serve o3 as an exploratory serve otherwise serve is not exploratory.

Thus according to embodiments of the invention, a proportion of the total number of serves is reserved for exploratory serves and the exploratory serves are distributed randomly amongst the non-exploratory serves. Where there is more than one alternative offer to the offer with the highest response rate, the alternative offers are served according to their ESPs. The total proportion of exploratory serves may be equal to the total of the ESPs.

If the serve is determined to be exploratory at operation 1407, the flow proceeds to operation 1409 where the offer chosen at operation 1407 is served.

Usual Serve Selection Algorithm.

If the serve is determined not to be exploratory at the random selection process performed in operation 1407, e.g. the offer selected is not one for which an ESP has been determined, the flow proceeds to operation 1411. Here a further selection process, e.g. another selection algorithm, is used to determine which offer to serve, following which the offer determined by that further selection process is served.

In a simple example according to embodiments of the invention, this may be the offer o4 with the highest response rate. In another example this could be another selection algorithm of the kind which might be used prior to this invention such as an algorithm using UCBs. It should be noted that this other algorithm might itself introduce some level of exploration in which case the flow of FIG. 14 may simply introduce a minimum or base level of exploration.

According to the embodiment of FIG. 14, one or more serve proportions are determined or updated at every serve decision, or before each selection of an offer. This is not essential and instead they may be updated or determined periodically, for example by time unit or number of impressions.

It will be seen that in operation 1407, a proportion of time is set aside for exploratory serves and these are served in proportion to the serve proportions determined in operation 1403, for example according to the process described with reference to FIG. 15. The proportion of time may be equal to or proportional to the total of the determined ESPs, and divided among the ESPs according to determined serve proportion.

A method of determining the ESPs according to embodiments of the invention will now be described with reference to FIG. 15. FIG. 15 shows a flowchart of calculation or the Exploratory Serve Probability (ESP) for each offer. The flow of FIG. 15 may be called from a main offer selection routine such as that shown in FIG. 14. The flowchart is now described in detail, with the text in each box displayed in italics, accompanied by an explanation. In the following an example is used where the time unit is days.

Set of Offer Ids:

The input to the flow of FIG. 15 at operation 1501 is the set of offers or offer ids as at operation 1401. The offers may be allocated a set of integer values, $i=0 \ldots i=n-1$, where n is the number of offers in the set of offers.

Find Offer with Best Response Rate:

The next operation 1503 is to find, e.g identify, the offer with the best, e.g. highest, response rate. If response rates for offers have not already been determined, this may include calculation of response rates, for example using known methods or a method according to embodiments of the invention such as the particular method described with reference to FIG. 12.

Calculate UCB:

Determine the upper confidence bound using the UCB algorithm for the offer with the best response rate.

$i=0$ At operation 1505 a counter for i is set to zero.

Is Offer i the Best Offer?

At operation 1507, it is determined whether offer i is the offer identified in operation 1503, e.g. the offer with the best or highest response rate. If this condition is satisfied, i is incremented at operation 1509 and operation 1507 is repeated. If this condition is not satisfied, the flow proceeds to operation 1511.

Give the Current Observed Response Rate, Calculate the Minimum Required Impressions "MRI" for the UCB of this Offer to be<=UCB of Best Offer:

At operation 1511, MRI is determined or calculated. This may be done by assuming that the response rates used in operation 1503 are correct, and performing UCB calculations with different numbers of impressions until this condition is met. The MRI is a number of serves from which a statistically significant estimate of response rate can be calculated.

Calculate Exploratory Serve Proportion.

At the next operation 1513 a serve proportion is determined, for example using the equation ESP=MRI/total impressions over time horizon. The time horizon is a configurable parameter representing the maximum period over which to calculate offer response rate. The shorter this period, the more exploration the system will do and the more sensitive it will be to change. Thus the number of serves from which a statistically significant estimate of response rate can be calculated may be used according to embodiments of the invention to determine the serve proportion, e.g. ESP.

Output ESPs:

At operation it is determined whether $i=n-1$? If so, EPSs have been determined for all but the best performing offer and the flow proceeds to operation 1517 where the ESPs are output and used in operation 1405. The output is one ESP for each offer.

It should be noted that the consequence of operations 1511 and 1513 is to determine the number of serves required (MRI) so that the UCBs in observed response rates of all offers are equal.

As more data is gathered using the processes of FIGS. 14 and 15, the response rates of the offers will be known more accurately and the observed response rates (which are the means of the regions of uncertainty) may move past each other. Example:

Offer 1 has observed resp rate, ORR=0.1, the standard error, sterr=0.05. Its sterr is high as it has few impressions.

Offer 2 has observed resp rate, ORR=0.15, the standard error, sterr=0.0001. Its sterr is low as it has many impressions.

For offer 1 there is a 16% chance its true response rate is greater than 0.15. If the true response rate is indeed greater, as more data is collected the observed response rate for offer 1 will pass offer 2 and offer 1 will start to be served most of the time.

FIGS. 5 and 16-18 show results from some simulations demonstrating the effects of the techniques discussed above.

Figure 16:
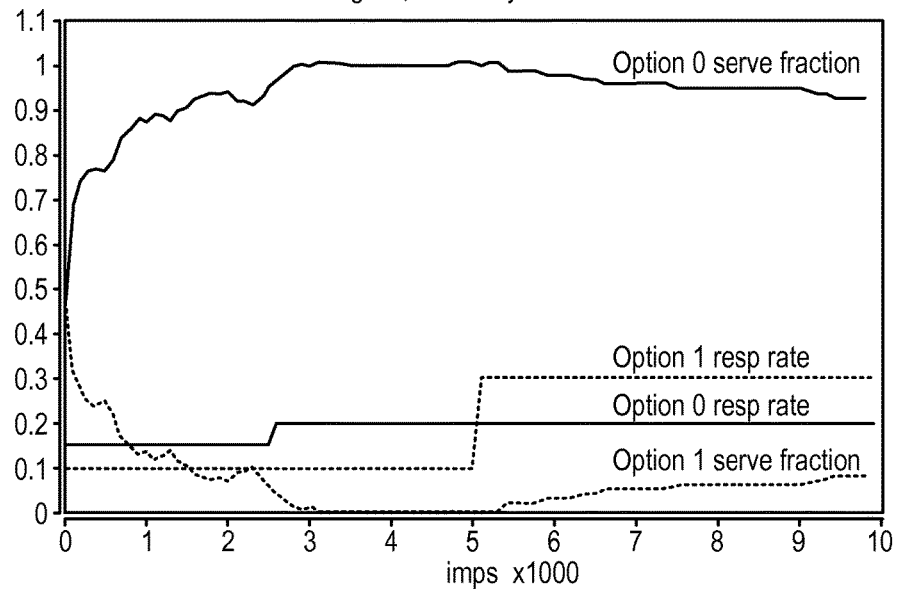
FIG. 16 is a graph showing the results from a simulation of A/B testing using response rate calculation according to embodiments of the invention.

FIG. 16 shows the results of UCB with response rate calculation according to the method of FIG. 13, with offer selection, without the additional modification of the methods shown in FIGS. 14 and 15. Already it can be seen that increasing numbers of exploratory impressions of option 1 are made after the change in response rate at 5000 impressions, which represents a significant improvement over the experiment represented by FIG. 5. However since the proportion of exploratory impressions was low prior to the change, there were not enough to determine the significance of the change and therefore the response to the change is gradual.

Figure 17:
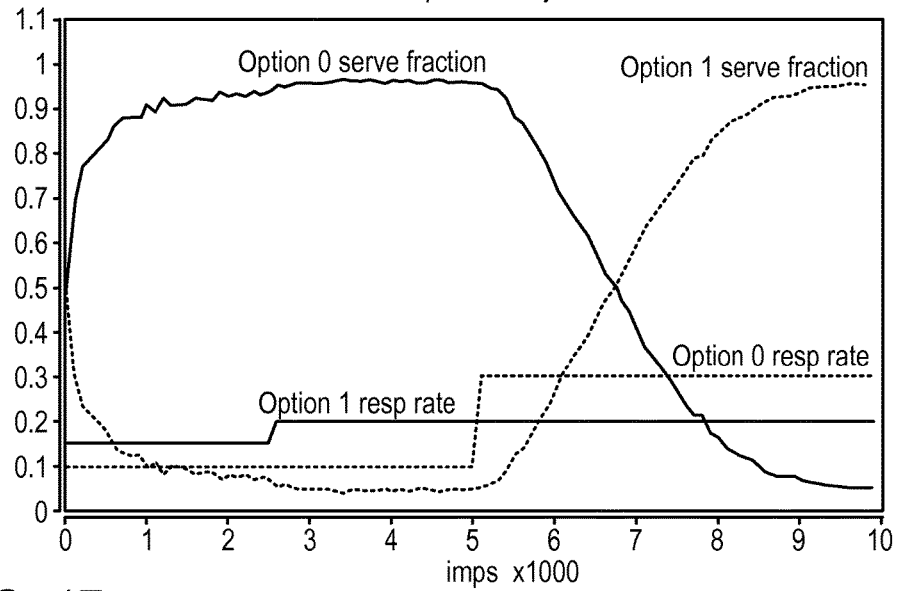
FIG. 17 is a graph showing the results from a simulation of A/B testing using a method of offer selection to achieve even exploration according to embodiments of the invention.

FIG. 17 shows the results of UCB with offer selection according to the method of FIGS. 14 and 15, without the additional improvement of response rate calculation as shown in FIG. 13. Here again there is a marked improvement over the experiment shown in FIG. 5 so that by 9000 impressions the best offer, option 1, is being served over 90% of the time.

Figure 18:
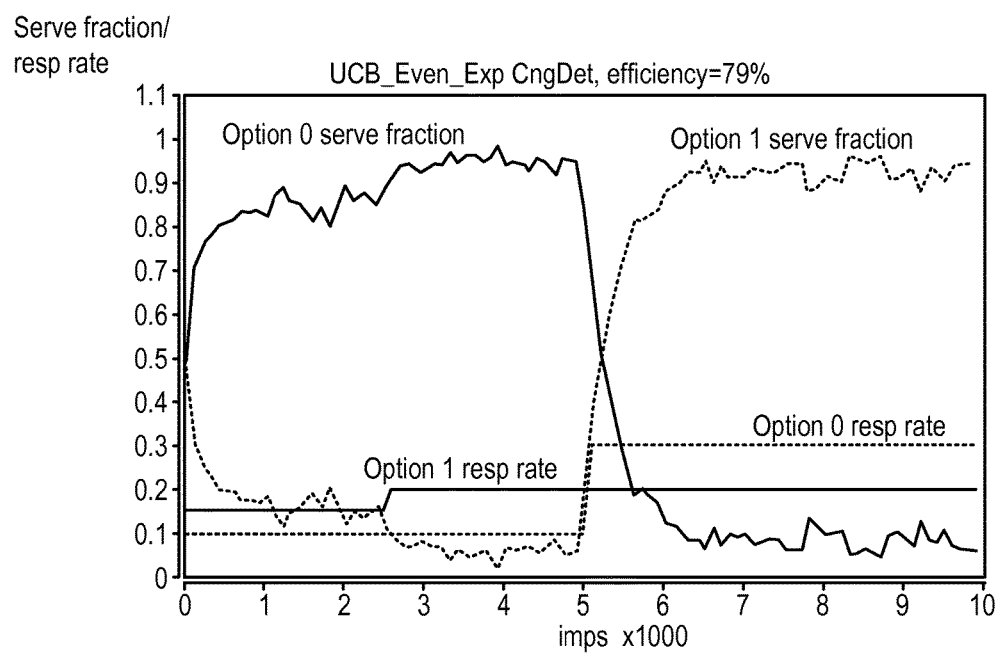
FIG. 18 is a graph showing the same scenario as that simulated in FIG. 16 when response rate calculation and offer selection are applied according to embodiments of the invention.

FIG. 18 shows the same scenario when response rate calculation according to FIG. 13 and offer selection according to FIGS. 14 and 15 are used together with UCB. The results show the response rate change is recognized and the predominant offer served is changed appropriately. The overall efficiency of the run increases from 65% to 85%.

Reference is made to FIG. 19 showing a high level block diagram of an exemplary computing system 1900 according to embodiments of the present invention, for example for use in systems according to embodiments of the invention. For example, A/B test server 801 or other computing devices carrying out all or part of embodiments of the present invention may include components such as those included in computing system 1900. Computing system 1900 may comprise a single computing device or components and functions of system 1900 may be distributed across multiple computing devices. Computing system 1900 may include one or more controllers such as controller 1905 that may be, for example, a central processing unit processor (CPU), a chip or any suitable processor or computing or computational device, an operating system 1915, a memory 1920, a storage 1930, input devices 1935 and an output devices 1940. For example, server 801 may include one or more controllers similar to controller 1905, server 801 may include one or more memory units similar to memory 1920 and server 801 may include one or more executable code segments similar to executable code 1925. One or more processors in one or more controllers such as controller 1905 may be configured to carry out methods according to embodiments of the invention. For example, one or more processors within controller 1905 may be connected to memory 1920 storing software or instructions that when executed by the one or more processors cause the one or more processors to carry out a method according to embodiments of the present invention. Controller 1905 or a central processing unit within controller 1905 may be configured, for example using instructions stored in memory 1920, to perform the estimation of response rates, determination of the range of uncertainty, the comparison with the upper and lower bounds and the selection of an estimate as the current response rate. The platforms 1001 and 1002 of FIG. 10 may be implemented as executable code stored in memory 1920 to be executed by one or more processors, for example in controller 1905.

Operating system 1915 may be or may include any code segment designed and/or configured to perform tasks involving coordination, scheduling, arbitration, supervising, controlling or otherwise managing operation of computing system 1900, for example, scheduling execution of programs. Operating system 1915 may be a commercial operating system. Memory 1920 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. In one embodiment, memory 1920 is a non-transitory processor-readable storage medium that stores instructions and the instructions are executed by controller 1905. Memory 1920 may be or may include a plurality of, possibly different memory units.

Executable code 1925 may be any executable code, e.g., an application, a program, a process, task or script. Executable code 1925 may be executed by controller 1905 possibly under control of operating system 1915.

In some embodiments, more than one computing system 1900 may be used. For example, a plurality of computing devices that include components similar to those included in computing system 1900 may be connected to a network and used as a system.

Storage 1930 may be or may include one or more storage components, for example, a hard disk drive, a Compact Disk (CD) drive, a CD-Recordable (CD-R) drive, a universal serial bus (USB) device or other suitable removable and/or fixed storage unit. For example, memory 1920 may be a non-volatile memory having the storage capacity of storage 1930. Accordingly, although shown as a separate component, storage 1930 may be embedded or included in memory 1920. Storage 1930 or memory 1920 may store identifiers of or content of offers, and may thus serve the function of offer repository 1003 shown in FIG. 10. They may also be used to store impression and response data and may serve the function of event repository 1110 shown in FIG. 11.

Input to and output from a computing system according to embodiments of the invention may be via an API, such as API 1912 shown in FIG. 19. The API 1912 shown in FIG. 19 operates under the control of the controller 1905 executing instructions stored in memory 1920. Input to and output from the system via the API may be via input/output port 1913. Input may comprise decision requests 1105, for example from respondent device 803 or website host server 801. Output may comprise an offer selection. This may be in the form of a signal that causes a selected offer to be presented to a respondent. The signal may identify the offer and it may also comprise the content of the offer, such as one or more of text, graphical information (including video) and audio information.

The A/B test server 801 may include user input devices. Input devices 1935 may be or may include a mouse, a keyboard, a touch screen or pad or any suitable input device. It will be recognized that any suitable number of input devices may be operatively connected to computing system 1900 as shown by block 1935.

The A/B server may include one or more output devices. Output devices 1940 may include one or more displays, speakers and/or any other suitable output devices. It will be recognized that any suitable number of output devices may be operatively connected to computing system 1900 as shown by block 1940. Any applicable input/output (I/O) devices may be connected to computing system 1900 as shown by blocks 1935 and 1940. For example, a wired or wireless network interface card (NIC), a modem, printer or a universal serial bus (USB) device or external hard drive may be included in input devices 1935 and/or output devices 1940.

Input devices 1935 and output devices 1940 are shown as providing input to the system 1900 via the API 1912 for the purpose of embodiments of the invention. For the performance of other functions carried out by system 1900, input devices 1935 and output devices 1940 may provide input to or receive output from other parts of the system 1900.

Alternatively all output from the A/B server may be to a remote device such as user device 805 in which case the output devices may be replaced by a data port.

Embodiments of the invention may include computer readable medium or an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, embodiments of the invention may comprise a storage medium such as memory 1920, computer-executable instructions such as executable code 1925 and a controller such as controller 1905.

A system according to embodiments of the invention may include components such as, but not limited to, a plurality of central processing units (CPU), e.g., similar to controller 1905, or any other suitable multi-purpose or specific processors or controllers, a plurality of input units, a plurality of output units, a plurality of memory units, and a plurality of storage units. An embodiment of system may additionally include other suitable hardware components and/or software components. In some embodiments, a system may include or may be, for example, a personal computer, a desktop computer, a mobile computer, a laptop computer, a notebook computer, a terminal, a workstation, a server computer, a Personal Digital Assistant (PDA) device, a tablet computer, a network device, or any other suitable computing device. Unless explicitly stated, the method embodiments described herein are not constrained to a particular order or sequence. Additionally, some of the described method embodiments or elements thereof can occur or be performed at the same point in time.

Unless explicitly stated, the method embodiments described herein are not constrained to a particular order or sequence. Additionally, some of the described method embodiments or elements thereof can occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

What is claimed is:

1. A method of calculating a current response rate at a point in time to web pages that are served multiple times to one or more respondents, wherein the response rate for a web page is the ratio of clicks to serves of the web page, the method comprising:
   a first server, comprising a processor, serving web pages a plurality of times to one or more user computers each comprising a processor;
   obtaining at a second server comprising a processor, for each of the plurality of web pages, response rate data from an event repository, the response rate data supplied by the first server;
   obtaining by a testing module at the second server, a first estimate of response rate to said web page over a first period of time ending at said point in time,
   obtaining by the testing module at the second server a second estimate of response rate to the web page over a second period of time wherein the second period of time is larger than the first period of time and ends at said point in time being the same point in time at which the first period of time ends;
   obtaining by the testing module at the second server a subsequent estimate of response rate for said web page over a period of time that is larger than the second period of time and that ends at said point in time being the same point in time at which the first period of time ends, the first period of time, second period of time, and period of time that is larger than the second period of time overlapping;
   determining by the testing module at the second server a range of uncertainty defined by upper and lower bounds for the estimates of response rate, wherein at least the first of said estimates is within the range of uncertainty;
   comparing by the testing module each estimate of response rate to one or both of the upper and lower bounds;
   using by the testing module the results of the comparing to select one of the estimates as the current response rate;
   using the current response rate to select a web page among the plurality of web pages for the first server to serve to a user computer; and
   incrementing the time period between successive response rate estimations;
   wherein said using comprises one of: selecting the first estimate that is outside the range of uncertainty or equal to one of the bounds of the range of uncertainty; and selecting the estimate before the first estimate that is outside the range of uncertainty.

2. The method of claim 1 wherein said determining comprises determining a range of uncertainty at obtaining of first, second and subsequent response rate estimation.

3. The method of claim 2 wherein the upper and lower bounds are maximum lower bound and minimum upper bound one or both of which are determined at a previous obtaining of response rate estimation.

4. The method of claim 1 wherein the upper bound or lower bound or both are derived from the standard error of the response rate estimation.

5. The method of claim 1 comprising incrementing the number of serves of the web page between successive response rate estimations.

6. The method of claim 1 in which said using comprises selecting an estimate that is within a predetermined margin of one of the upper and lower bounds.

7. The method of claim 1 comprising using the time period corresponding to the selected estimate to estimate when a change in response rate for the web page occurred.

8. A method of selecting a web page to be served to a user computer amongst a set of web pages using one or more processors in a computing system, wherein the method of selecting comprises:
   obtaining at computer A/B test server comprising a processor, response data for the set of web pages, from an event repository, the response rate data supplied by a computer website host server comprising a processor;
   receiving at the computer A/B test server a request from the computer website host server for a selection of a web page from the set of web pages;
   obtaining by a testing module at the computer A/B test server a first estimate of response rate for a first web page of said set of web pages over a first period of time ending at a current time wherein the response rate is the ratio of clicks to serves of the web page when the web page is served to a user computer comprising a processor,
   obtaining by the testing module a second estimate of response rate for said first web page over a period of time that is larger than said first period of time and ends at said current time being the same current time at which the first period of time ends;
   obtaining by the testing module a subsequent estimate of response rate for said first web page over a period of time that is larger than the second period of time and that ends at said current time being the same current time at which the first period of time ends, the first period of time, second period of time, and period of time that is larger than the second period of time overlapping;
   determining by the testing module a range of uncertainty for each obtained estimate of response rate, wherein at least the first obtained estimate is within the range of uncertainty;
   repeating said obtaining a subsequent estimate of response rate and determining a range of uncertainty and when the subsequent estimate of response rate is outside the determined range of uncertainty ceasing the repeating said obtaining; and selecting the last obtained estimate as the current response rate for said first web page based on said identifying;

repeating each of said obtaining, said determining and said selecting for each web page of said set of web pages to determine a current response rate for each web page;

using the determined current response rates to select a web page from the set of pages to be served;

outputting to the website host server a signal identifying the selected web page to cause the selected web page to be presented to a respondent; and for at least one web page of the set of web pages, determining a corresponding serve proportion, wherein determining a serve proportion comprises determining the number of serves required to achieve an upper confidence bound "UCB" for said at least one web page that is less than or equal to the UCB for the web page with the highest response rate.

9. The method of claim 8 comprising:

using a random selection process to select a web page to be served in which the determined serve proportion is used as a weighting factor for the corresponding web page.

10. The method of claim 9 wherein the determining of serve proportion is performed before each selection of a web page, or at regular intervals of either time or number of serves.

11. The method of claim 9 comprising:

if said random selection process selects a web page for which a serve proportion has been determined, serving said selected web page, and if said random selection process does not select a web page for which a serve proportion has been determined, using a further selection process to determine which web page of said set of web pages is to be served and serving a web page determined by said further selection process.

12. The method of claim 11 in which the further selection process uses an upper confidence bound algorithm or selects the web page with the highest response rate.

13. The method of claim 9 further comprising identifying the web page with the highest response rate, wherein said at least one web page is other than the with the highest response rate.

14. A system for determining a current response rate at a point in time to web pages that are served multiple times to one or more respondents, wherein the response rate for a web page is the ratio of clicks to serves of the web page, the system comprising an A/B test server, the A/B test server comprising:

an event repository storing impressions of the web pages at user computers each comprising a processor prior to the point in time, and storing corresponding responses received from a computer website host computer comprising a processor; and one or more processors configured to use data in the event repository to:

obtain by a testing module a first estimate of response rate to the web page over a first period wherein the response rate is the ratio of clicks to serves of the web page;

obtain by the testing module a second estimate of response rate to the web page over a second period longer than the first period wherein the first and second periods end at the same point in time;

obtain by the testing module a subsequent estimate of response rate to the web page over a period of time that is larger than the second period and that ends at said same point in time, the first period, second period, and period of time that is larger than the second period overlapping;

determine by the testing module a range of uncertainty defined by upper and lower bounds for the estimates of response rate, wherein at least said first estimate is within the range of uncertainty;

compare by the testing module each estimate of response rate to one or both of the upper and lower bounds;

use the results of the comparing to select one of the first, second and subsequent estimates as the current response rate;

use the current response rate to select a web page among the plurality of web pages for the computer website host computer to serve to a user computer; and increment the time period between successive response rate estimations;

wherein said using comprises one of: selecting the first estimate that is outside the range of uncertainty or equal to one of the bounds of the range of uncertainty; and selecting the estimate before the first estimate that is outside the range of uncertainty.

15. A system as claimed in claim 14 wherein using the current response rates to select a web page comprises:

for at least one of the web pages of the set of web pages determining a corresponding serve proportion that depends on the current response rate; and using a random selection process to select a web page to be served in which the determined serve proportion is used as a weighting factor for the corresponding web page.

* * * * *